US010924240B2

(12) United States Patent
Sridharan et al.

(10) Patent No.: US 10,924,240 B2
(45) Date of Patent: Feb. 16, 2021

(54) SOUNDING REFERENCE SIGNAL TRANSMISSION TO INDICATE A VIRTUAL ANTENNA PORT

(71) Applicant: QUALCOMM Incorporated, San Diego, CA (US)

(72) Inventors: Gokul Sridharan, Sunnyvale, CA (US); Alexandros Manolakos, San Diego, CA (US); Yi Huang, San Diego, CA (US); Wanshi Chen, San Diego, CA (US); Wei Yang, San Diego, CA (US); Jay Kumar Sundararajan, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/805,394

(22) Filed: Feb. 28, 2020

(65) Prior Publication Data

US 2020/0313815 A1 Oct. 1, 2020

(30) Foreign Application Priority Data

Mar. 26, 2019 (GR) .............................. 20190100134

(51) Int. Cl.
*H04L 5/00* (2006.01)
*H04B 7/0456* (2017.01)

(52) U.S. Cl.
CPC ......... *H04L 5/0048* (2013.01); *H04B 7/0456* (2013.01)

(58) Field of Classification Search
CPC ............... H04L 5/0048; H04L 27/2613; H04L 27/2607; H04L 5/0062; H04L 1/06;
(Continued)

(56) References Cited

U.S. PATENT DOCUMENTS

2008/0192849 A1* 8/2008 Kim .......................... H04L 1/06
375/260
2010/0202560 A1* 8/2010 Luo ...................... H04B 7/0691
375/295
(Continued)

FOREIGN PATENT DOCUMENTS

WO WO-2019029697 A1 2/2019
WO WO-2019032855 A1 2/2019

OTHER PUBLICATIONS

Ericsson: "On Full Power UL Transmission", 3GPP Draft, 3GPP TSG RAN WG1 Meeting #96, R1-1902826 on Full Power UL Transmission, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600521, pp. 1-19, Retrieved from the Internet: URL: http://www.3gpp.org/ftp/tsg%5Fran/WG1%5FRL1/TSGR%5F96/Docs/R1%2D1902826%2Ezip, [retrieved on Feb. 16, 2019], pp. 3-7.8.

(Continued)

*Primary Examiner* — Hardikkumar D Patel
(74) *Attorney, Agent, or Firm* — Harrity & Harrity, LLP; Kevin M. Donnelly

(57) ABSTRACT

Various aspects of the present disclosure generally relate to wireless communication. In some aspects, a user equipment (UE) may transmit a sounding reference signal (SRS) on a plurality of antenna ports. The UE may transmit the SRS on one or more virtual antenna ports, the one or more virtual antenna ports being based at least in part on the plurality of antenna ports. Numerous other aspects are provided.

30 Claims, 18 Drawing Sheets

(58) Field of Classification Search
CPC . H04L 25/03343; H04L 1/001; H04L 5/0094; H04B 7/0456; H04B 7/0691; H04B 7/0689; H04B 7/0669; H04B 7/0417; H04B 7/0473; H04B 7/0413; H04B 7/046; H04B 7/0639; H04B 7/0615; H04B 7/0619; H04B 7/0626
See application file for complete search history.

(56) References Cited

U.S. PATENT DOCUMENTS

| | | | | |
|---|---|---|---|---|
| 2011/0286548 | A1* | 11/2011 | Robert Safavi | H04L 27/2607 375/295 |
| 2016/0036507 | A1* | 2/2016 | Wang | H04B 7/0473 375/267 |
| 2019/0140729 | A1* | 5/2019 | Zhang | H04B 7/0669 |
| 2019/0229870 | A1* | 7/2019 | Wu | H04L 25/0226 |

OTHER PUBLICATIONS

International Search Report and Written Opinion—PCT/US2020/020551—ISAEPO—dated May 25, 2020.
Qualcomm Incorporated: "Full TX Power for UL Transmissions", 3GPP Draft, 3GPP TSG RAN WG1 Meeting #96, R1-1903011 Full TX Power for UL Transmissions, 3rd Generation Partnership Project (3GPP), Mobile Competence Centre, 650, Route Des Lucioles, F-06921 Sophia-Antipolls Cedex, France, vol. RAN WG1, No. Athens. Greece, Feb. 25, 2019-Mar. 1, 2019, Feb. 16, 2019 (Feb. 16, 2019), XP051600708, pp. 1-14, Retrieved from the Internet: URL: http://www.3gpp.org/ftp/tsg%5Fran/WG1%5FRL1/TSGR1%5F96/Docs/R1%2D1903011%2Ezip, [retrieved on Feb. 16, 2019], pp. 6.10.11; figures 1.2.4.

* cited by examiner

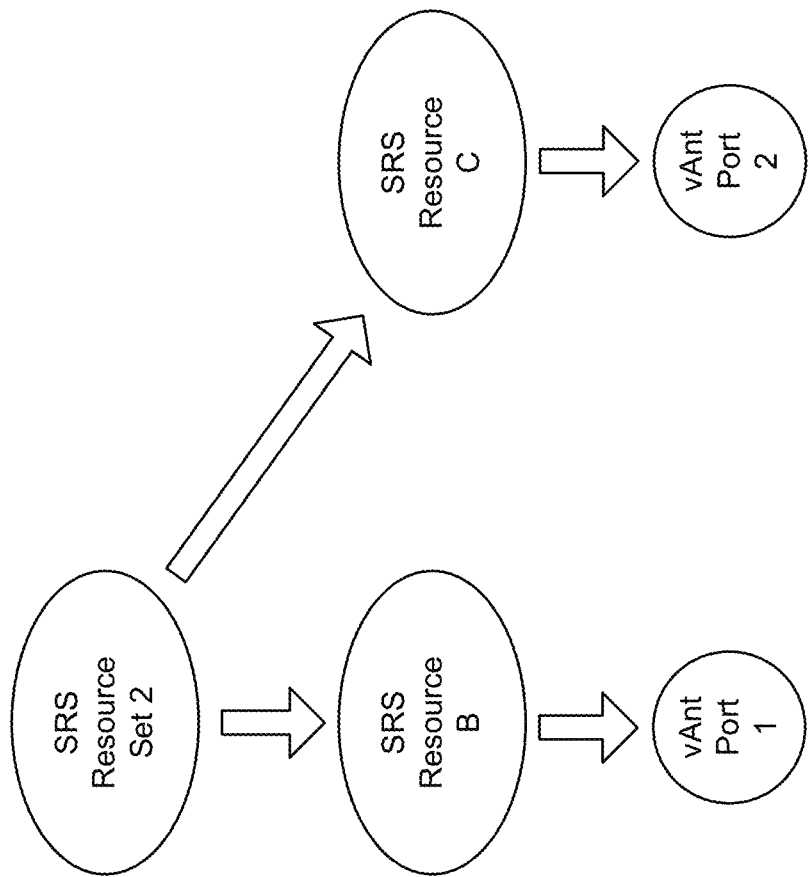
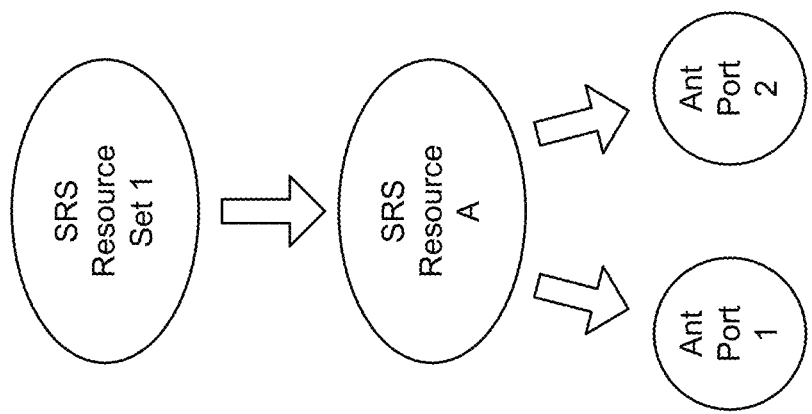
FIGURE 4E

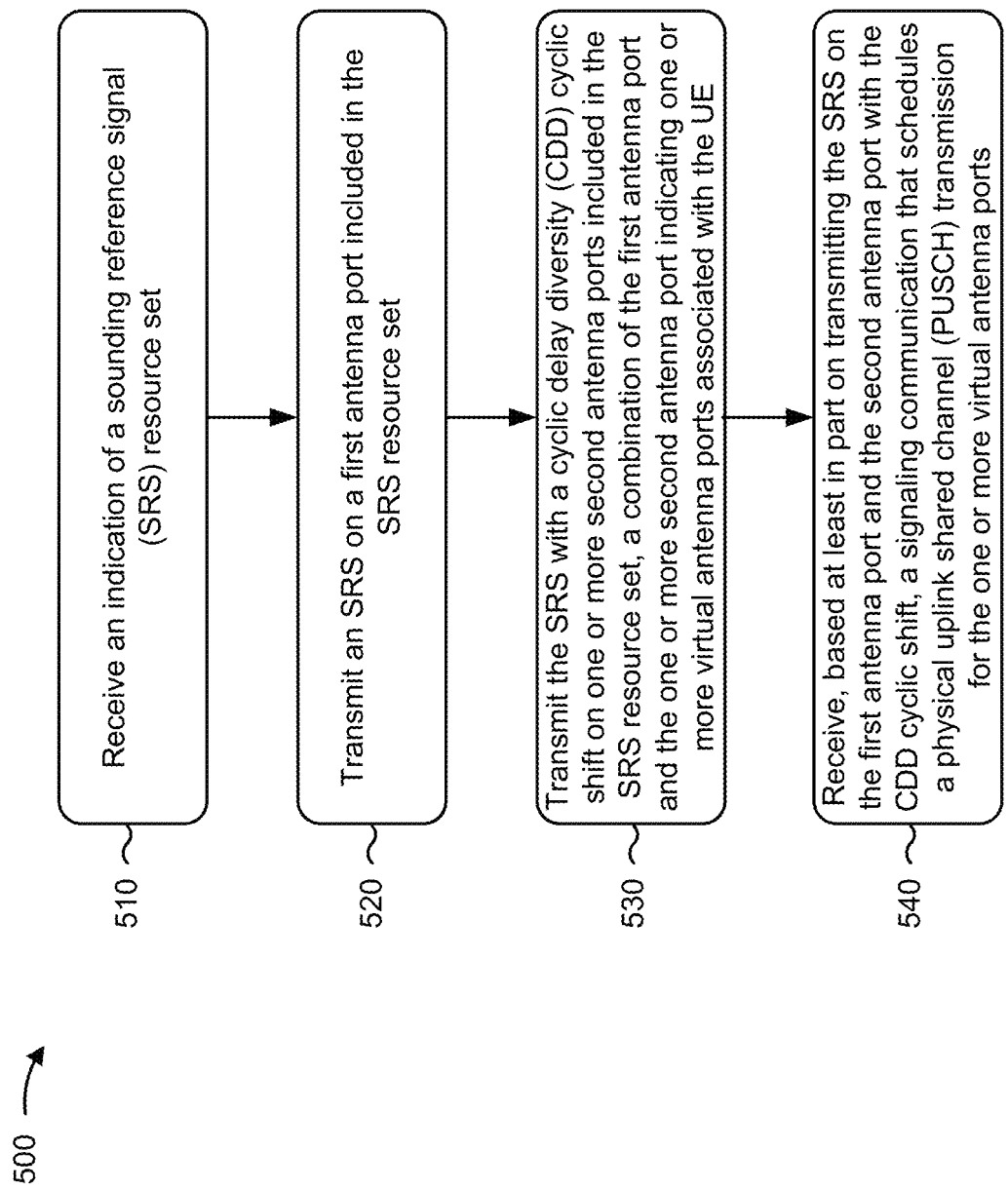

SOUNDING REFERENCE SIGNAL TRANSMISSION TO INDICATE A VIRTUAL ANTENNA PORT

CROSS-REFERENCE TO RELATED APPLICATION

This application claims priority to Greece Application No. 20190100134, filed on Mar. 26, 2019, entitled "SOUNDING REFERENCE SIGNAL TRANSMISSION TO INDICATE A VIRTUAL ANTENNA PORT," which is hereby expressly incorporated by reference herein.

FIELD OF THE DISCLOSURE

Aspects of the present disclosure generally relate to wireless communication, and more particularly to techniques and apparatuses for sounding reference signal (SRS) transmission to indicate a virtual antenna port.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A multi-antenna UE may apply various techniques to synthesize non-coherent or partially coherent antenna ports into a virtual antenna port so that common precoding may be used on the virtual antenna port and applied across the non-coherent antenna ports. However, a base station (B S) may be unaware of the virtual antenna port and, therefore, may not utilize the virtual antenna port when scheduling the PUSCH transmission. This may result in the BS scheduling the PUSCH transmission for a non-coherent or partially coherent antenna port of the UE, which may result in decreased transmit power of the PUSCH transmission, decreased reliability of the PUSCH transmission (due to lack of transmit or spatial diversity), or the like.

SUMMARY

In some aspects, a method of wireless communication, performed by a user equipment (UE), may include receiving an indication of a sounding reference signal (SRS) resource set; transmitting an SRS on a first antenna port included in the SRS resource set; transmitting the SRS with a cyclic delay diversity (CDD) cyclic shift on one or more second antenna ports included in the SRS resource set, a combination of the first antenna port and the one or more second antenna ports indicating one or more virtual antenna ports associated with the UE; and receiving, based at least in part on transmitting the SRS on the first antenna port and the second antenna port with the CDD cyclic shift, a signaling communication that schedules a physical uplink shared channel (PUSCH) transmission for the one or more virtual antenna ports.

In some aspects, a UE for wireless communication may include memory and one or more processors operatively coupled to the memory. The memory and the one or more processors may be configured to receive an indication of an SRS resource set; transmit the SRS with a CDD cyclic shift on one or more second antenna ports included in the SRS resource set, a combination of the first antenna port and the one or more second antenna ports indicating one or more virtual antenna ports associated with the UE; and receive, based at least in part on transmitting the SRS on the first antenna port and the second antenna port with the CDD cyclic shift, a signaling communication that schedules a PUSCH transmission for the one or more virtual antenna ports.

In some aspects, a non-transitory computer-readable medium may store one or more instructions for wireless communication. The one or more instructions, when executed by one or more processors of a UE, may cause the one or more processors to receive an indication of an SRS resource set; transmit an SRS on a first antenna port included in the SRS resource set; transmit the SRS with a CDD cyclic shift on one or more second antenna ports included in the SRS resource set, a combination of the first antenna port and the one or more second antenna ports indicating one or more virtual antenna ports associated with the UE; and receive, based at least in part on transmitting the SRS on the first antenna port and the second antenna port with the CDD cyclic shift, a signaling communication that schedules a PUSCH transmission for the one or more virtual antenna ports.

In some aspects, an apparatus for wireless communication may include means for receiving an indication of an SRS resource set; means for transmitting an SRS on a first antenna port included in the SRS resource set; means for transmitting the SRS with a CDD cyclic shift on one or more second antenna ports included in the SRS resource set, a combination of the first antenna port and the one or more second antenna ports indicating one or more virtual antenna ports associated with the UE; and means for receiving, based at least in part on transmitting the SRS on the first antenna port and the second antenna port with the CDD cyclic shift, a signaling communication that schedules a PUSCH transmission for the one or more virtual antenna ports.

In some aspects, a method of wireless communication, performed by a UE, may include transmitting an SRS on a plurality of antenna ports; and transmitting the SRS on one or more virtual antenna ports, the one or more virtual antenna ports being based at least in part on the plurality of antenna ports.

In some aspects, a UE for wireless communication may include memory and one or more processors operatively coupled to the memory. The memory and the one or more processors may be configured to transmit an SRS on a plurality of antenna ports; and transmit the SRS on one or more virtual antenna ports, the one or more virtual antenna ports being based at least in part on the plurality of antenna ports.

In some aspects, a non-transitory computer-readable medium may store one or more instructions for wireless communication. The one or more instructions, when executed by one or more processors of a UE, may cause the one or more processors to: transmit an SRS on a plurality of antenna ports; and transmit the SRS on one or more virtual antenna ports, the one or more virtual antenna ports being based at least in part on the plurality of antenna ports.

In some aspects, an apparatus for wireless communication may include means for transmitting an SRS on a plurality of antenna ports; and means for transmitting the SRS on one or more virtual antenna ports, the one or more virtual antenna ports being based at least in part on the plurality of antenna ports.

In some aspects, a method of wireless communication, performed by a base station (BS), may include receiving an SRS that is transmitted in an SRS resource set; identifying, based at least in part on the SRS, a first antenna port and a second antenna port included in the SRS resource set, the SRS being transmitted on the one or more second antenna ports with a CDD cyclic shift; determining one or more virtual antenna ports from the first antenna port and the one or more second antenna ports; and transmitting a signaling communication that schedules a PUSCH transmission for the one or more virtual antenna ports.

In some aspects, a BS for wireless communication may include memory and one or more processors operatively coupled to the memory. The memory and the one or more processors may be configured to receive an SRS that is transmitted in an SRS resource set; identify, based at least in part on the SRS, a first antenna port and a second antenna port included in the SRS resource set, the SRS being transmitted on the one or more second antenna ports with a CDD cyclic shift; determine one or more virtual antenna ports from the first antenna port and the one or more second antenna ports; and transmit a signaling communication that schedules a PUSCH transmission for the one or more virtual antenna ports.

In some aspects, a non-transitory computer-readable medium may store one or more instructions for wireless communication. The one or more instructions, when executed by one or more processors of a B S, may cause the one or more processors to receive an SRS that is transmitted in an SRS resource set; identify, based at least in part on the SRS, a first antenna port and a second antenna port included in the SRS resource set, the SRS being transmitted on the one or more second antenna ports with a CDD cyclic shift; determine one or more virtual antenna ports from the first antenna port and the one or more second antenna ports; and transmit a signaling communication that schedules a PUSCH transmission for the one or more virtual antenna ports.

In some aspects, an apparatus for wireless communication may include means for receiving an SRS that is transmitted in an SRS resource set; means for identifying, based at least in part on the SRS, a first antenna port and a second antenna port included in the SRS resource set, the SRS being transmitted on the one or more second antenna ports with a CDD cyclic shift; means for determining one or more virtual antenna ports from the first antenna port and the one or more second antenna ports; and means for transmitting a signaling communication that schedules a PUSCH transmission for the one or more virtual antenna ports.

In some aspects, a method of wireless communication, performed by a BS, may include receiving an SRS on a plurality of antenna ports; receiving the SRS on one or more virtual antenna ports, the one or more virtual antenna ports being based at least in part on the plurality of antenna ports; identifying the one or more virtual antenna ports based at least in part on the receiving the SRS on the one or more virtual antenna ports; and transmitting a signaling communication that schedules a PUSCH transmission for the one or more virtual antenna ports.

In some aspects, a BS for wireless communication may include memory and one or more processors operatively coupled to the memory. The memory and the one or more processors may be configured to receive an SRS on a plurality of antenna ports; receive the SRS on one or more virtual antenna ports, the one or more virtual antenna ports being based at least in part on the plurality of antenna ports; identify the one or more virtual antenna ports based at least in part on the receiving the SRS on the one or more virtual antenna ports; and transmit a signaling communication that schedules a PUSCH transmission for the one or more virtual antenna ports.

In some aspects, a non-transitory computer-readable medium may store one or more instructions for wireless communication. The one or more instructions, when executed by one or more processors of a B S, may cause the one or more processors to receive an SRS on a plurality of antenna ports; receive the SRS on one or more virtual antenna ports, the one or more virtual antenna ports being based at least in part on the plurality of antenna ports; identify the one or more virtual antenna ports based at least in part on the receiving the SRS on the one or more virtual antenna ports; and transmit a signaling communication that schedules a PUSCH transmission for the one or more virtual antenna ports.

In some aspects, an apparatus for wireless communication may include means for receiving an SRS on a plurality of antenna ports; means for receiving the SRS on one or more virtual antenna ports, the one or more virtual antenna ports being based at least in part on the plurality of antenna ports; means for identifying the one or more virtual antenna ports based at least in part on the receiving the SRS on the one or more virtual antenna ports; and means for transmitting a signaling communication that schedules a PUSCH transmission for the one or more virtual antenna ports.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 3A, 3B, and 4A-4H are diagrams illustrating examples of sounding reference signal (SRS) transmission to indicate a virtual antenna port.

FIG. 5 is a diagram illustrating an example process for SRS transmission to indicate a virtual antenna port, performed by a UE, in accordance with various aspects of the present disclosure.

DETAILED DESCRIPTION

Figure 1:
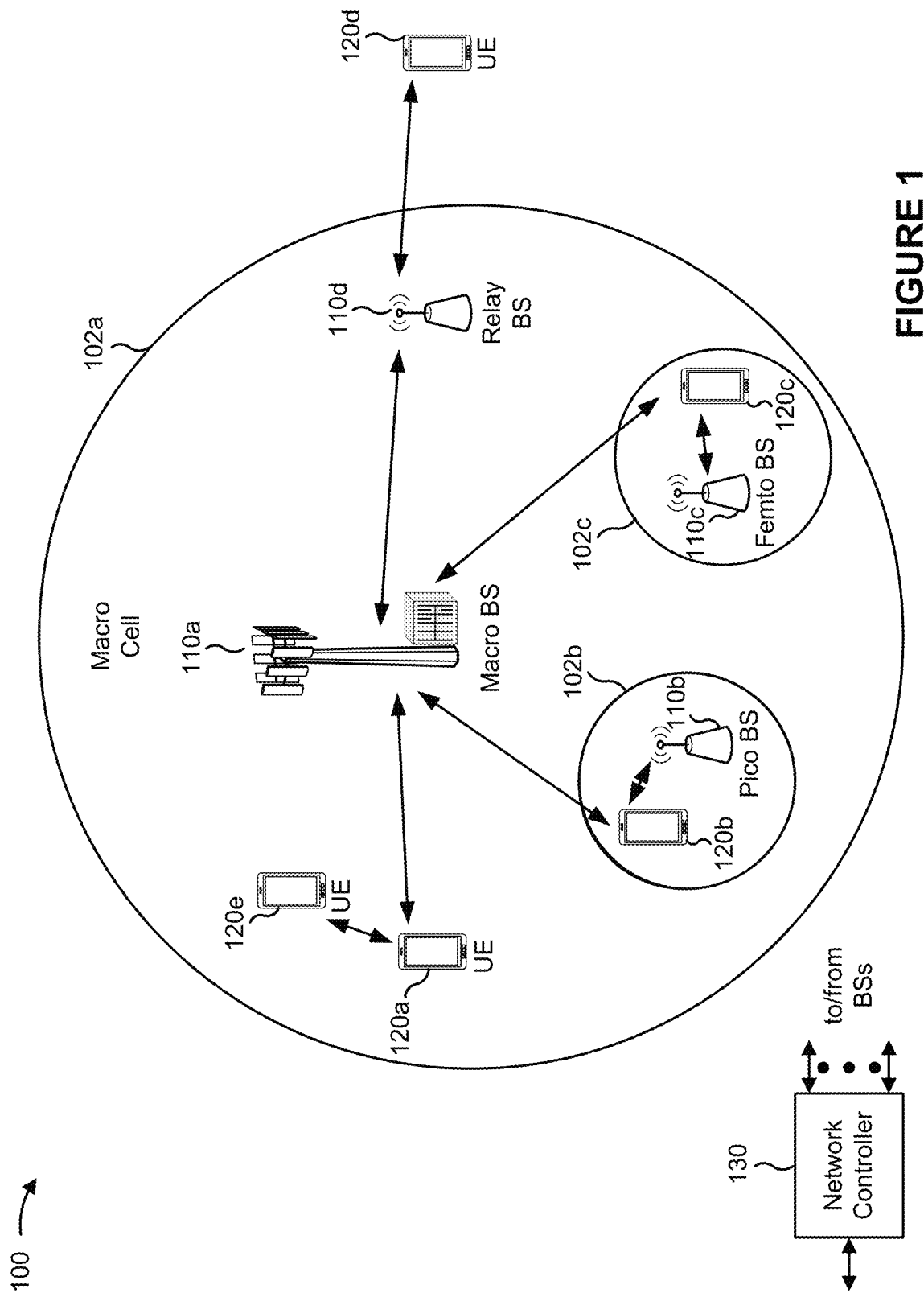
FIG. 1 is a block diagram illustrating an example wireless network in accordance with various aspects of the present disclosure.

Various aspects of the disclosure are described more fully hereinafter with reference to the accompanying drawings. This disclosure may, however, be implemented in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be implemented by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G or 4G wireless technologies, aspects of the present disclosure can be applied in other generation-based communication systems, such as 5G and later, including NR technologies.

Antennas of a multi-antenna user equipment (UE) may be classified into one of three states depending on coherence of antenna ports of the antennas of the UE. A set of antenna ports (for example, two antenna ports) are coherent if the relative phase among the set of antenna ports (for example, between the two antenna ports) remains the same between the time of a sounding reference signal (SRS) transmission from those antenna ports and a subsequent physical uplink shared channel (PUSCH) transmission from those antenna ports. In this case, the SRS may be used (for example, by the UE or a base station (BS)) to determine an uplink precoder for precoding the PUSCH transmission, because the relative phase of the antenna ports will be the same for the SRS transmission and the PUSCH transmission. The precoding may span across the set of coherent antenna ports (sometimes referred to herein as coherent ports).

If a set of antenna ports is non-coherent, then such uplink precoder determination becomes difficult because the relative phase between the antenna ports will change from the SRS transmission to the PUSCH transmission. For example, a set of antenna ports is considered non-coherent if the relative phase among the set of antenna ports is different for the SRS transmission than for the PUSCH transmission. In this case, the use of the same uplink precoder for a set of non-coherent antenna ports may result in the UE applying improper or inaccurate precoding weights (such as phase and gain weights) to the data streams transmitted from the non-coherent antenna ports. Furthermore, a set of antenna ports is considered partially-coherent if a first subset of the set of antenna ports is coherent with one another and a second subset of the set of antenna ports is coherent with one another, but the first subset of antenna ports and the second subset of antenna ports are not coherent with one another. In this case, common precoding may be used within each of the respective subsets of coherent ports, but not across the different subsets of non-coherent ports.

In some cases, when a BS schedules a PUSCH transmission for a multi-antenna UE having non-coherent or partially-coherent antenna ports, the signaling communication that schedules the PUSCH transmission may identify an uplink precoder that is to be used to precode the PUSCH transmission. Conventionally, because the antenna ports of the UE are non-coherent (or, in the case of partially coherent antenna ports, are non-coherent groups of coherent antenna ports), the UE may be capable of using the uplink precoder for only one of the antenna ports (or antenna port groups) while other antenna ports (or antenna port groups) are not used for the PUSCH transmission. Because only a subset of non-coherent or partially coherent antenna ports are used, this may result in decreased transmit power of the PUSCH transmission, decreased reliability of the PUSCH transmission (due to lack of transmit or spatial diversity), or the like.

To utilize some or all of the non-coherent or partially coherent antenna ports, the UE may apply various techniques to synthesize non-coherent or partially coherent antenna ports into a virtual antenna port so that common precoding may be used on the virtual antenna port and applied across the non-coherent antenna ports. A virtual (or logical) antenna port may represent a combination of two or more antenna ports. This allows a BS to select an uplink precoder for the virtual antenna port, and allows the UE to use the uplink precoder to transmit on the otherwise non-coherent or partially coherent antenna ports that have been combined to form the virtual antenna port. However, the BS may be unaware of the virtual antenna port and, therefore, may not utilize the virtual antenna port when scheduling the PUSCH transmission. This may result in the BS scheduling the PUSCH transmission for a non-coherent or partially coherent antenna port of the UE, which may result in decreased transmit power of the PUSCH transmission, decreased reliability of the PUSCH transmission (due to lack of transmit or spatial diversity), or the like, as described above.

Some aspects, described herein, provide techniques and apparatuses enabling an SRS transmission to indicate a virtual antenna port. In some aspects, the BS may be capable of indicating, to the UE, one or more parameters for generating the virtual antenna port. For example, the BS may indicate, to the UE, a plurality of antenna ports to synthesize into the virtual antenna port, one or more uplink precoders to apply to one or more of the antenna ports, a cyclic delay diversity (CDD) cyclic shift to apply to one or more of the antenna ports, or the like.

The UE may generate the virtual antenna port based at least in part on the one or more parameters and may use various SRS transmission techniques and configurations to indicate the virtual antenna port to the BS. For example, the UE may indicate a virtual antenna port to the BS by transmitting an SRS on a first antenna port and a second antenna port included in an SRS resource set. The UE may transmit the SRS on the second antenna port with a CDD cyclic shift. The combination of the first antenna port and the second antenna port may implicitly indicate the virtual antenna port to the BS. As another example, the UE may explicitly indicate a virtual antenna port to the BS by transmitting an SRS on a plurality of antenna ports and transmitting the SRS on a virtual antenna port that is determined based at least in part on the plurality of antenna ports (for example, by precoding the plurality of antenna ports and applying a CDD cyclic shift to one or more antenna ports of the plurality of antenna ports).

In this way, the BS may identify the virtual antenna port indicated by the UE and may schedule a PUSCH transmission for the virtual antenna port. This permits the UE to use non-coherent or partially coherent antenna ports for the PUSCH transmission, which may increase transmit power of the PUSCH transmission, increase reliability of the PUSCH transmission (as a result of transmit or spatial diversity of the PUSCH transmission), or the like.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of BSs 110 (shown as BS 110a, BS 110b, BS 110c, and BS 110d) and other network entities. A BS is an entity that communicates with UE(s) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

Wireless network 100 may also include relay stations. A relay station is an entity that can receive a transmission of data from an upstream station (for example, a BS or a UE)

and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a, 120b, 120c) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
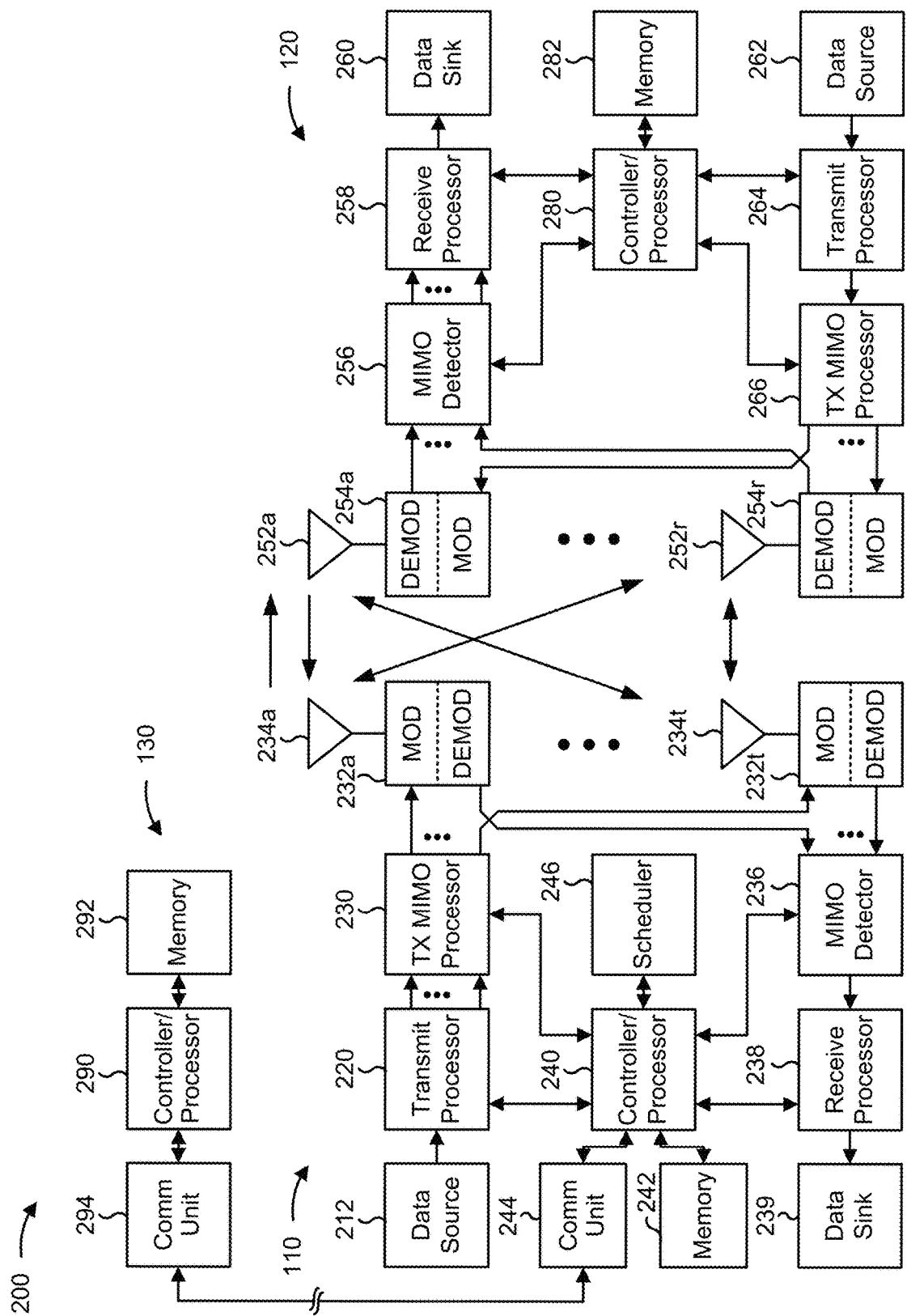
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with SRS transmission to indicate a virtual antenna port, as described in more detail elsewhere herein. For example, controller/processor 240 of base station 110, controller/processor 280 of UE 120, or any other component(s) of FIG. 2 may perform or direct operations of, for example, process 500 of FIG. 5, process 600 of FIG. 6, process 700 of FIG. 7, process 800 of FIG. 8, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving an indication of an SRS resource set, means for transmitting the SRS with a CDD cyclic shift on one or more second antenna ports included in the SRS resource set, a combination of the first antenna port and the one or more second antenna ports indicating one or more virtual antenna ports associated with the UE, means for receiving, based at least in part on transmitting the SRS on the first antenna port and the second antenna port with the CDD cyclic shift, a signaling communication that schedules a PUSCH transmission for the one or more virtual antenna ports, or the like, or combinations thereof. In some aspects, UE 120 may include means for transmitting an SRS on a plurality of antenna ports, means for transmitting the SRS on one or more virtual antenna ports, the one or more virtual antenna ports being based at least in part on the plurality of antenna ports, or the like, or combinations thereof. In some aspects, such means may include one or more components of UE 120 described in connection with FIG. 2.

In some aspects, base station 110 may include means for receiving an SRS that is transmitted in an SRS resource set, means for identifying, based at least in part on the SRS, a first antenna port and a second antenna port included in the SRS resource set, the SRS being transmitted on the one or more second antenna ports with a CDD cyclic shift, means for determining one or more virtual antenna ports from the first antenna port and the one or more second antenna ports, means for transmitting a signaling communication that schedules a PUSCH transmission for the one or more virtual antenna ports, or the like, or combinations thereof. In some aspects, base station 110 may include means for receiving an SRS on a plurality of antenna ports, means for receiving the SRS on one or more virtual antenna ports, the one or more virtual antenna ports being based at least in part on the plurality of antenna ports, means for identifying the one or more virtual antenna ports based at least in part on the receiving the SRS on the one or more virtual antenna ports, means for transmitting a signaling communication that schedules a PUSCH transmission for the one or more virtual antenna ports, or the like, or combinations thereof. In some aspects, such means may include one or more components of base station 110 described in connection with FIG. 2.

Figure 3A:
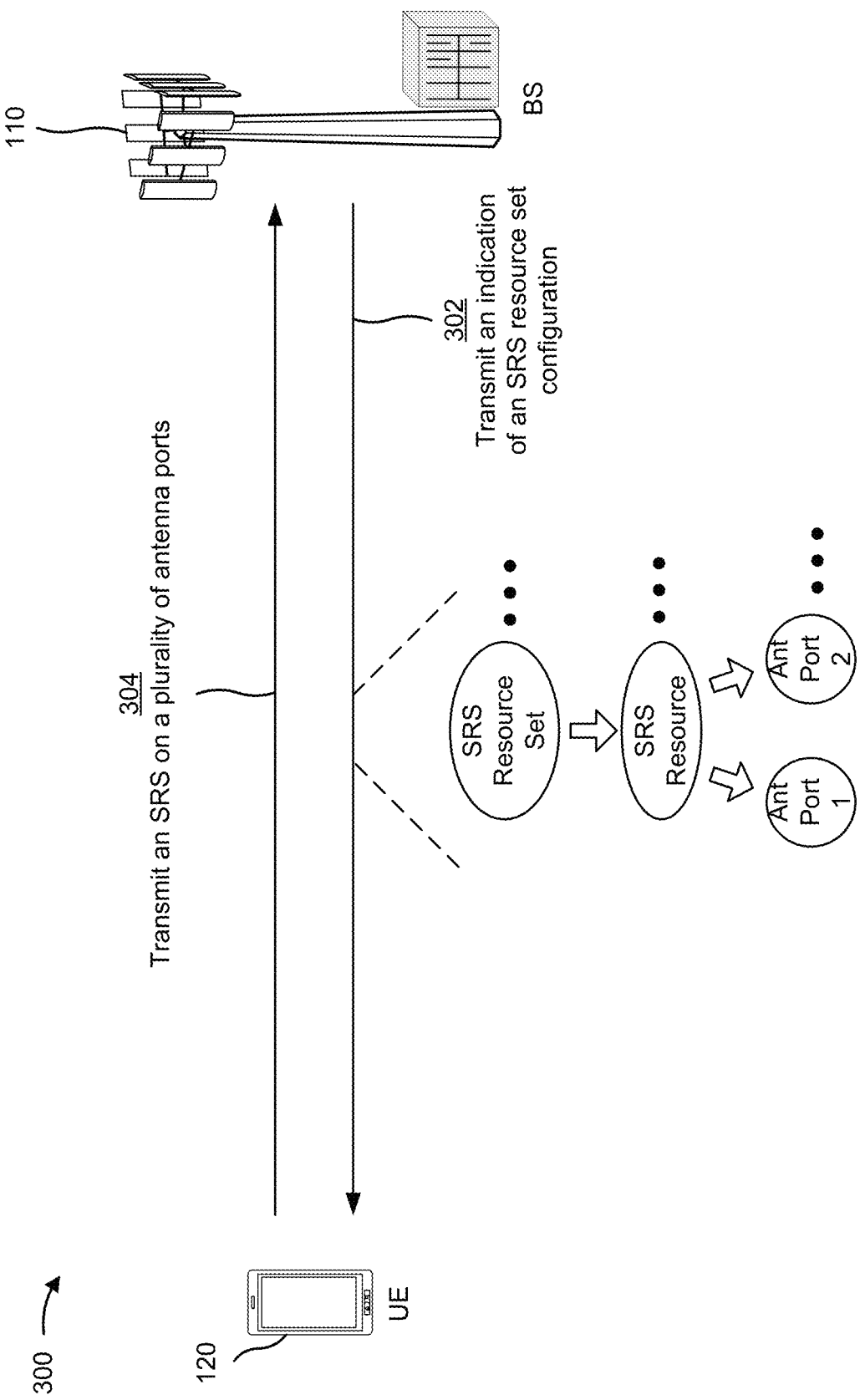
Figure 3B:
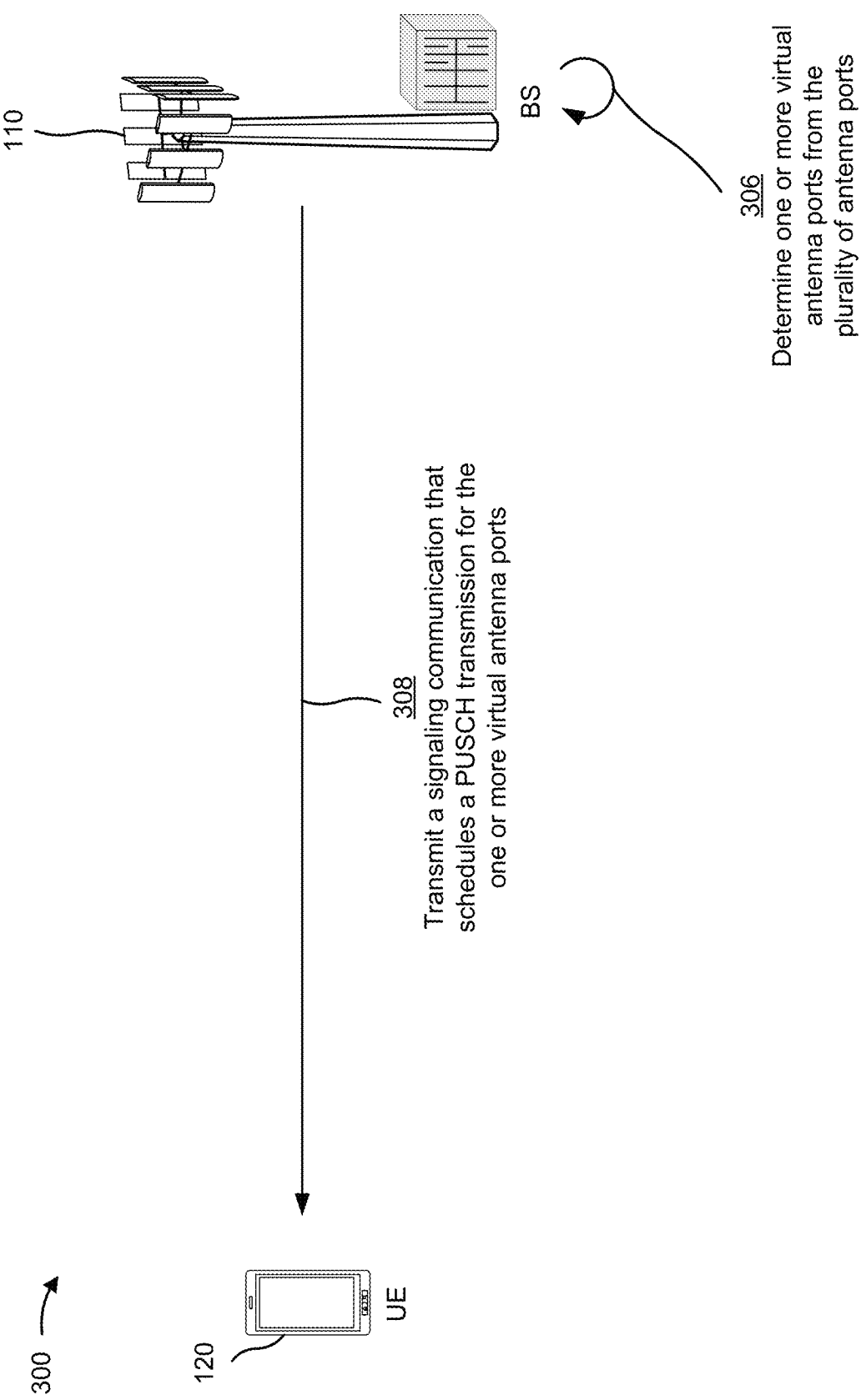

FIGS. 3A and 3B are diagrams 300 illustrating an example of the use of an SRS transmission to indicate a virtual antenna port in accordance with various aspects of the present disclosure. As shown in FIGS. 3A and 3B, the example involves a multi-antenna UE (for example, UE 120) and a BS (for example, BS 110). The antenna ports, associated with UE 120, may be non-coherent antenna ports or partially coherent antenna ports.

In some aspects, BS 110 may schedule a PUSCH transmission for UE 120 and may indicate an uplink precoder for the PUSCH transmission. Conventionally, because the antenna ports of UE 120 are non-coherent or partially coherent, UE 120 may be capable of using the uplink precoder for only one of the antenna ports (or antenna port groups) while other antenna ports (or antenna port groups) are not used for the PUSCH transmission. However, in the example illustrated in FIGS. 3A and 3B, UE 120 may implicitly indicate one or more virtual antenna ports to BS 110 by transmitting an SRS on respective antenna ports. In some aspects, a transmission of the SRS on one or some of the antenna ports of the respective antenna ports is transmitted with a CDD cyclic shift. The combination of the SRSs transmitted on the respective antenna ports may serve as an implicit indication of the one or more virtual antenna ports. BS 110 may indicate that UE 120 is to use the uplink precoder, for the PUSCH transmission, for the one or more virtual antenna ports. This permits the UE to use non-coherent or partially coherent antenna ports for the PUSCH transmission, which may increase transmit power of the PUSCH transmission, increase reliability of the PUSCH transmission (as a result of transmit or spatial diversity of the PUSCH transmission), or the like.

As shown in FIG. 3A, in a first operation 302, BS 110 may transmit an indication of an SRS resource set configuration to UE 120. In some aspects, BS 110 may transmit the indication of the SRS resource set configuration to UE 120 in a signaling communication, such as a radio resource control (RRC) communication, a medium access control (MAC) control element (MAC-CE) communication, a downlink control information (DCI) communication, or the like.

The SRS resource set configuration may indicate a configuration for one or more SRS resource sets that UE 120 may use to transmit an SRS to BS 110. An SRS resource set may include one or more SRS resources, which may each include time resources or frequency resources (for example, a slot, a symbol, a resource block, a periodicity for the time resources, or the like). The SRS resource set configuration may map an SRS resource to one or more antenna ports of UE 120 (such as Antenna Port 1, Antenna Port 2, and so on, as illustrated in the example shown in FIG. 3A). Thus, the SRS resource set configuration may indicate one or more time-frequency resources in which an SRS is to be transmitted, and may indicate one or more antenna ports on which the SRS is to be transmitted in those time-frequency resources.

Moreover, in some aspects, the SRS resource set configuration may indicate a use case (for example, in an SRS—SetUse information element) for the SRS resource set. For example, an SRS resource set may have a use case for antenna switching, codebook, non-codebook, beam management, or the like.

An antenna switching SRS resource set may be used to indicate downlink channel state information (CSI) with reciprocity between an uplink and downlink channel. For example, when there is reciprocity between an uplink channel and a downlink channel, a BS 110 may use an antenna switching SRS (for example, an SRS transmitted using a resource of an antenna switching SRS resource set) to acquire downlink CSI (for example, to determine a downlink precoder to be used to communicate with the UE 120).

A codebook SRS resource set may be used to indicate uplink CSI when a BS 110 indicates an uplink precoder to UE 120. For example, when BS 110 is configured to indicate an uplink precoder to UE 120 (for example, using a precoder codebook), the BS 110 may use a codebook SRS (for example, an SRS transmitted using a resource of a codebook SRS resource set) to acquire uplink CSI (for example, to determine an uplink precoder to be indicated to UE 120 and used by UE 120 to communicate with BS 110).

A non-codebook SRS resource set may be used to indicate uplink CSI when the UE 120 selects an uplink precoder to be used by the UE 120 (for example, instead of BS 110 selecting and indicating the uplink precoder). For example, when UE 120 is configured to select an uplink precoder, BS 110 may use a non-codebook SRS (for example, an SRS transmitted using a resource of a non-codebook SRS resource set) to acquire uplink CSI. In this case, the non-codebook SRS may be precoded using a precoder selected by the UE 120, which may be indicated to the BS 110).

A beam management SRS resource set may be used for indicating CSI for millimeter wave communications.

As further shown in FIG. 3A, and in a second operation 304, UE 120 may transmit an SRS on a plurality of antenna ports. In some aspects, UE 120 may transmit the SRS on a subset of the plurality of antenna ports with a CDD cyclic shift. For example, UE 120 may transmit an SRS on a first antenna port (for example, Antenna Port 1) and a second antenna port (for example, Antenna Port 2) of the plurality of antenna ports of the UE 120. In some aspects, UE 120 may transmit the SRS on the plurality of antenna ports based at least in part on the SRS resource set configuration received from the BS 110. For example, UE 120 may determine that the SRS resource set configuration indicates that the SRS resource is mapped to the plurality of antenna ports, and UE 120 may accordingly transmit the SRS on the plurality of antenna ports based at least in part on determining that the SRS resource set configuration indicates that the SRS resource is mapped to the plurality of antenna ports.

In some aspects, UE 120 may generate one or more virtual antenna ports from the plurality of antenna ports prior to transmitting the SRS in operation 304. In such aspects, the transmission of the SRS on the plurality of antenna ports in operation 304 consists of the transmission of the SRS on the one or more virtual antenna ports generated from the plurality of antenna ports. To transmit the SRS on the one or more virtual antenna ports, UE 120 may precode the SRS on the plurality of antenna ports. For example, if the plurality of antenna ports are non-coherent antenna ports, UE 120 may precode the SRS on the plurality of antenna ports based at least in part on an uplink precoder indicated in the SRS resource set configuration (for example, where the SRS resource set configuration is associated with a codebook SRS resource set). In some aspects, the plurality of antenna ports may be determined from sets of partially coherent antenna ports associated with UE 120. In this case, UE 120 may apply a pairwise precoder to the partially coherent sets of antenna ports to determine the plurality of antenna ports.

Moreover, UE 120 may apply CDD to all or a subset of the plurality of antenna ports prior to transmitting the SRS on the one or more virtual antenna ports. CDD may refer to a technique where a cyclic shift (also referred to as a cyclic delay) is introduced in the SRS transmission on one or more antenna ports relative to other antenna ports. For example, UE 120 may apply a cyclic shift to the SRS to be transmitted on the second antenna port so that the SRS is transmitted with CDD. The cyclic shift may be measured in samples (for example, 5 samples, 10 samples, or more or less), or fractions of samples, among other examples. For example, the SRS on the first antenna port may be transmitted in a first stream of samples, and the SRS on the second antenna port may be transmitted in a second stream of samples (for example, which may be the same stream) with a cyclic shift (for example, a shift of 5 samples or 10 samples, among other examples). For example, for a cyclic shift of 5 samples where 16 samples are transmitted per symbol, the 16 samples of the SRS on the first antenna port may be transmitted with a first sample transmitted first (for example, [s1, s2, s3, s4, . . . , s16]), and 16 samples of the SRS on the second antenna port may transmitted with the first sample transmitted sixth (for example, with a delay of five samples) (for example, [s12, s13, s14, s15, s16, s1, s2, s3, . . . , s11]).

As shown in FIG. 3B, in a third operation 306, BS 110 may determine one or more virtual antenna ports, associated with UE 120, from the transmission of the SRS on the plurality of antenna ports. In some aspects, the transmission of the SRS on the plurality of antenna ports may be an implicit indication of the one or more virtual antenna ports. BS 110 may determine the one or more virtual antenna ports by determining respective channels that map to the one or more virtual antenna ports. BS 110 may determine the respective channels that map to the one or more virtual antenna ports based at least in part on identifying the SRS transmitted on the plurality of antenna ports, determining the respective channels that map to the plurality of antenna ports, and combining the respective channels to determine the channel that maps to the one or more virtual antenna ports.

In some aspects, BS 110 may perform one or more measurements (for example, one or more received power measurements or one or more received quality measurements, among other examples) of the SRS transmitted on the plurality of antenna ports. BS 110 may determine channel state information (CSI) of the respective channels based at least in part on the one or more measurements, and may use the CSI of the respective channels to determine CSI of a channel that would be used by the UE 120 to transmit the PUSCH transmission on the one or more virtual antenna ports. Moreover, BS 110 may select an uplink precoder for the PUSCH transmission based at least in part on the CSI of the channel mapped to the one or more virtual antenna ports.

As further shown in FIG. 3B, in a fourth operation 308, BS 110 may transmit, to UE 120, a signaling communication that schedules the PUSCH transmission for the one or more virtual antenna ports. In some aspects, the signaling communication may indicate the one or more virtual antenna ports, may indicate the uplink precoder selected for the PUSCH transmission (for example, a transmitted precoder matrix indicator (TPMI) associated with the uplink precoder), as well as other information relating to frequency and timing resources for the PUSCH transmission. In some aspects, BS 110 may transmit a plurality of signaling communications, and each signaling communication may schedule respective PUSCH transmissions for respective virtual antenna ports.

In this way, UE 120 may implicitly indicate a virtual antenna port to BS 110, and BS 110 may indicate that UE 120 is to use the uplink precoder, for the PUSCH transmission, for the virtual antenna port. This permits the UE to use non-coherent or partially coherent antenna ports for the PUSCH transmission, which may increase transmit power of the PUSCH transmission, increase reliability of the PUSCH transmission (as a result of transmit or spatial diversity of the PUSCH transmission), or the like.

FIGS. 4A-4H are diagrams 400 illustrating an example of the use of an SRS transmission to indicate a virtual antenna port in accordance with various aspects of the present disclosure. As shown in FIGS. 4A-4H, the example may involve a multi-antenna UE (for example, UE 120) and a BS (for example, BS 110). The antenna ports, associated with UE 120, may be non-coherent antenna ports or partially coherent antenna ports.

In some aspects, BS 110 may schedule a PUSCH transmission for UE 120 and may indicate an uplink precoder for the PUSCH transmission. Conventionally, because the antenna ports of UE 120 are non-coherent or partially coherent, UE 120 may be capable of using the uplink precoder for only one of the antenna ports (or antenna port groups) while other antenna ports (or antenna port groups) are not used for the PUSCH transmission. However, in the example illustrated in FIGS. 4A-4H, UE 120 may explicitly indicate a virtual antenna port to BS 110 by transmitting an SRS on a plurality of antenna ports and transmitting the SRS using the virtual antenna port. BS 110 may indicate that UE 120 is to use the uplink precoder, for the PUSCH transmission, for the virtual antenna port. This permits the UE to use non-coherent or partially coherent antenna ports for the PUSCH transmission, which may increase transmit power of the PUSCH transmission, increase reliability of the PUSCH transmission (as a result of transmit or spatial diversity of the PUSCH transmission), or the like.

Figure 4A:
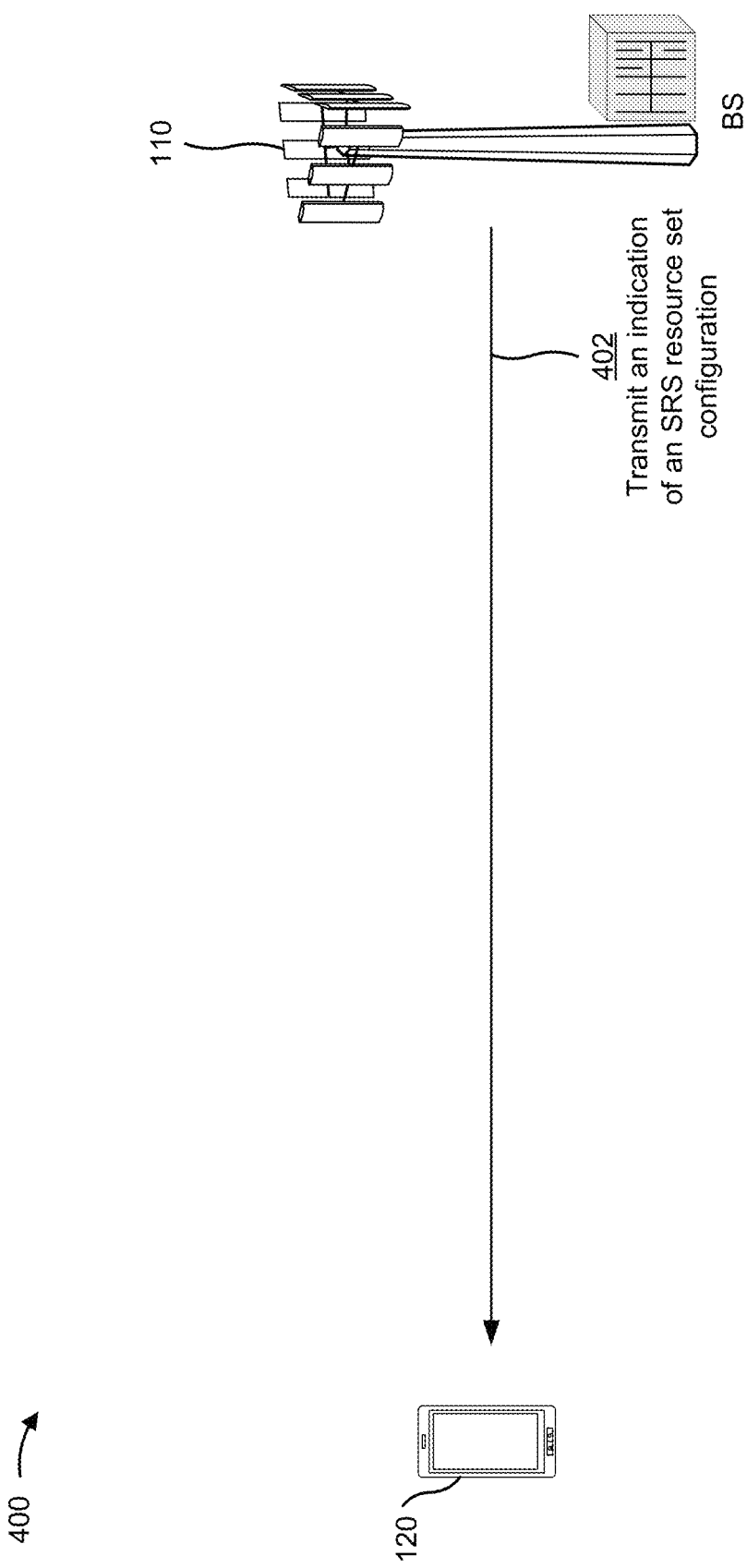

As shown in FIG. 4A, in a first operation 402, BS 110 may transmit an indication of an SRS resource set configuration to UE 120. In some aspects, BS 110 may transmit the indication of the SRS resource set configuration to UE 120 in a signaling communication, such as an RRC communication, a MAC-CE communication, a DCI communication, or the like.

The SRS resource set configuration may indicate a configuration for an SRS resource set that UE 120 may use to transmit an SRS to BS 110. The SRS resource set may include one or more SRS resources, which may each include time resources or frequency resources (for example, a slot, a symbol, a resource block, a periodicity for the time resources, or the like). The SRS resource set configuration may map an SRS resource to one or more antenna ports of UE 120 and may map another SRS resource to one or more virtual antenna ports of UE 120. Thus, the SRS resource set configuration may indicate one or more time-frequency resources in which an SRS is to be transmitted, and may indicate a plurality of antenna ports and one or more virtual antenna ports on which the SRS is to be transmitted in those time-frequency resources.

FIGS. 4B-4E illustrate various examples of SRS resource set configurations that BS 110 may indicate to UE 120. However, other examples of SRS resource set configurations may be indicated by BS 110 and used by UE 120.

Figure 4B:
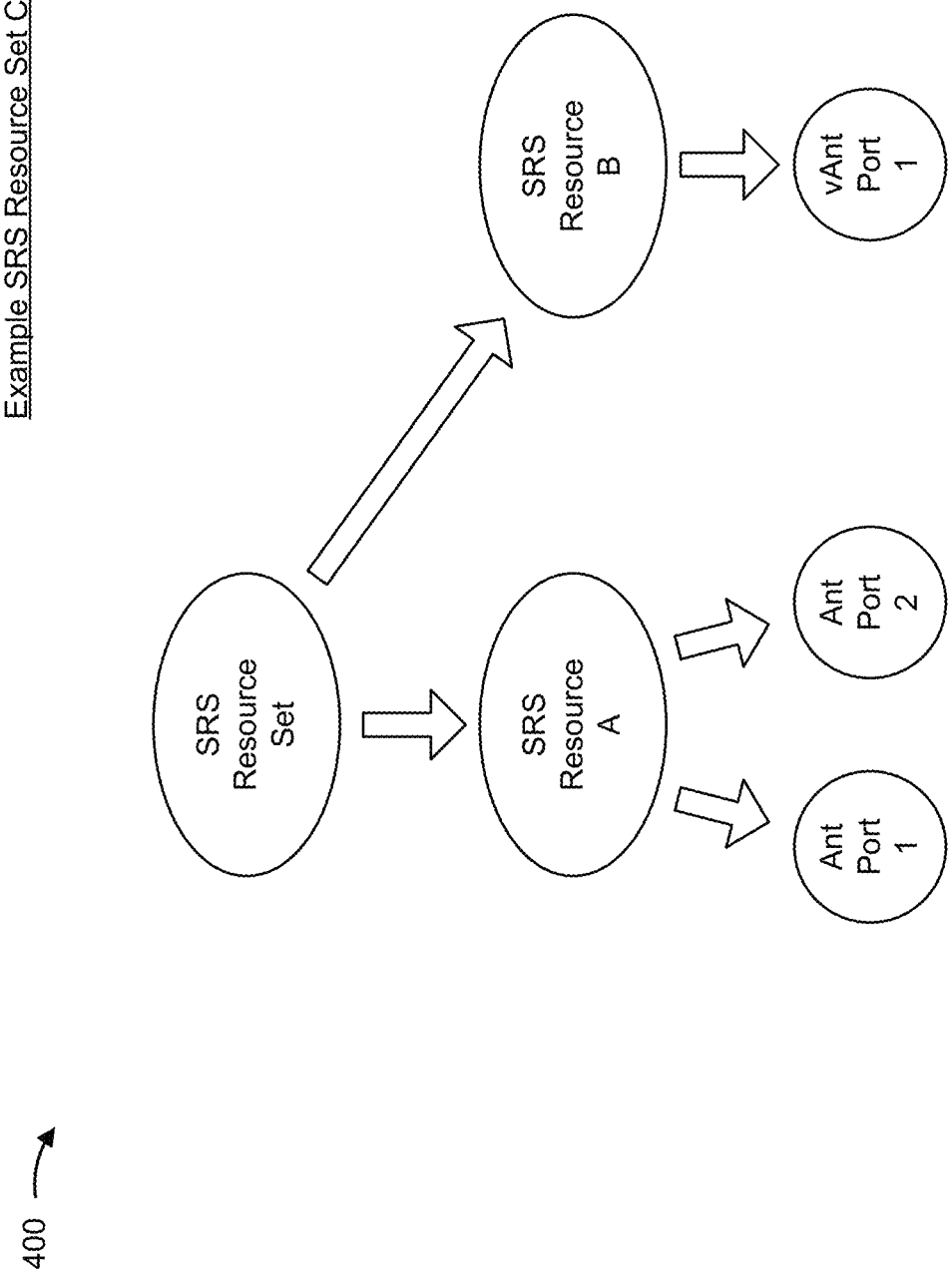

As illustrated in FIG. 4B, example SRS resource set configuration 1 may include an SRS resource set that configures a plurality of SRS resources (for example, SRS resource A and SRS resource B). SRS resource A may be mapped to a plurality of antenna ports (for example, antenna port 1 and antenna port 2) and SRS resource B may be mapped to a virtual antenna port (for example, virtual antenna port 1).

Figure 4C:
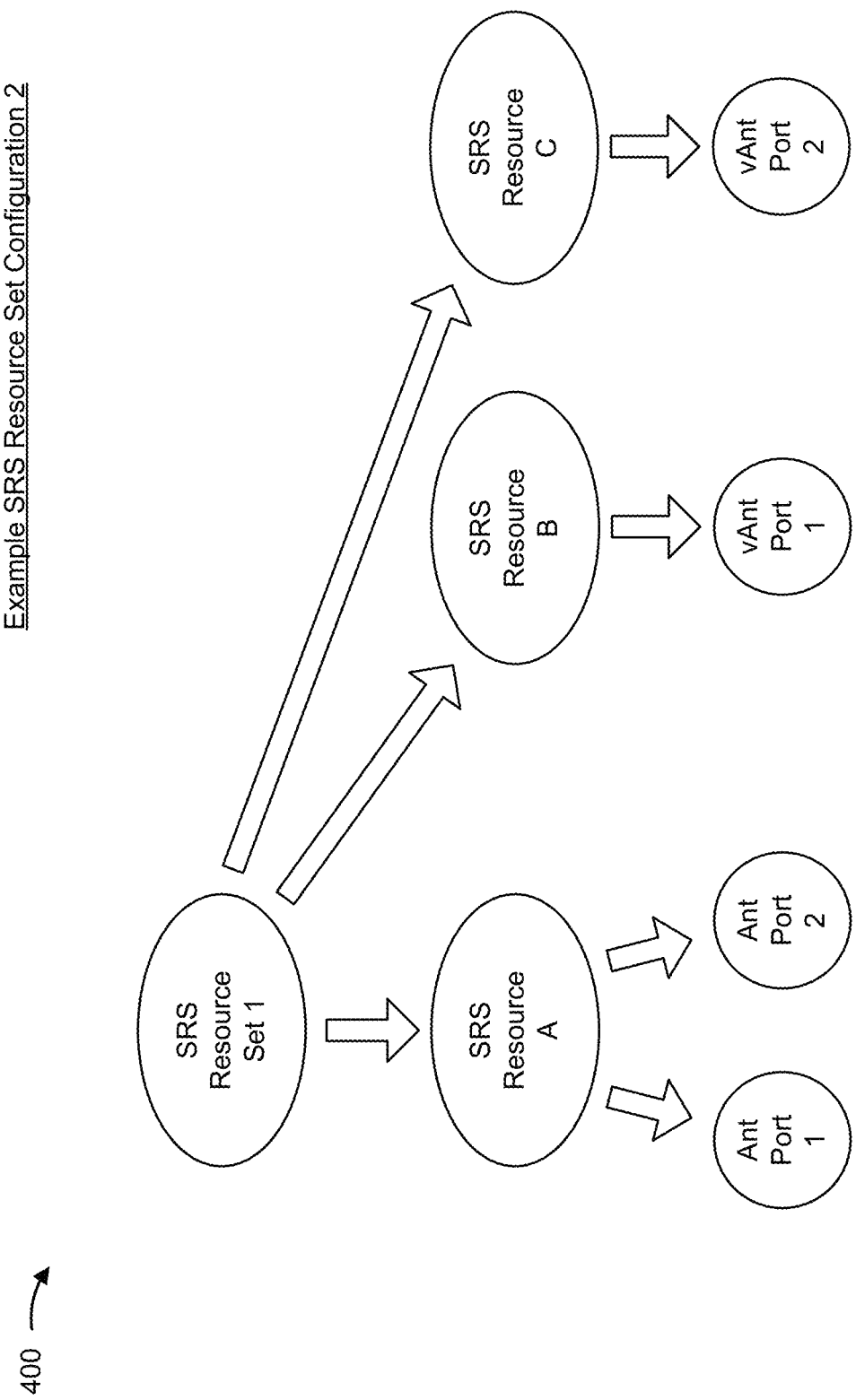

As illustrated in FIG. 4C, example SRS resource set configuration 2 may include an SRS resource set that configures a plurality of SRS resources (for example, SRS resource A, SRS resource B, and SRS resource C). SRS resource A may be mapped to a plurality of antenna ports (for example, antenna port 1 and antenna port 2), SRS resource B may be mapped to a virtual antenna port (for example, virtual antenna port 1), and SRS resource C may be mapped to another virtual antenna port (for example, virtual antenna port 2). In some aspects, if the SRS resource set configuration is to indicate additional virtual antenna ports, each additional virtual antenna port may be mapped to a respective SRS resource in the SRS resource set.

Figure 4D:
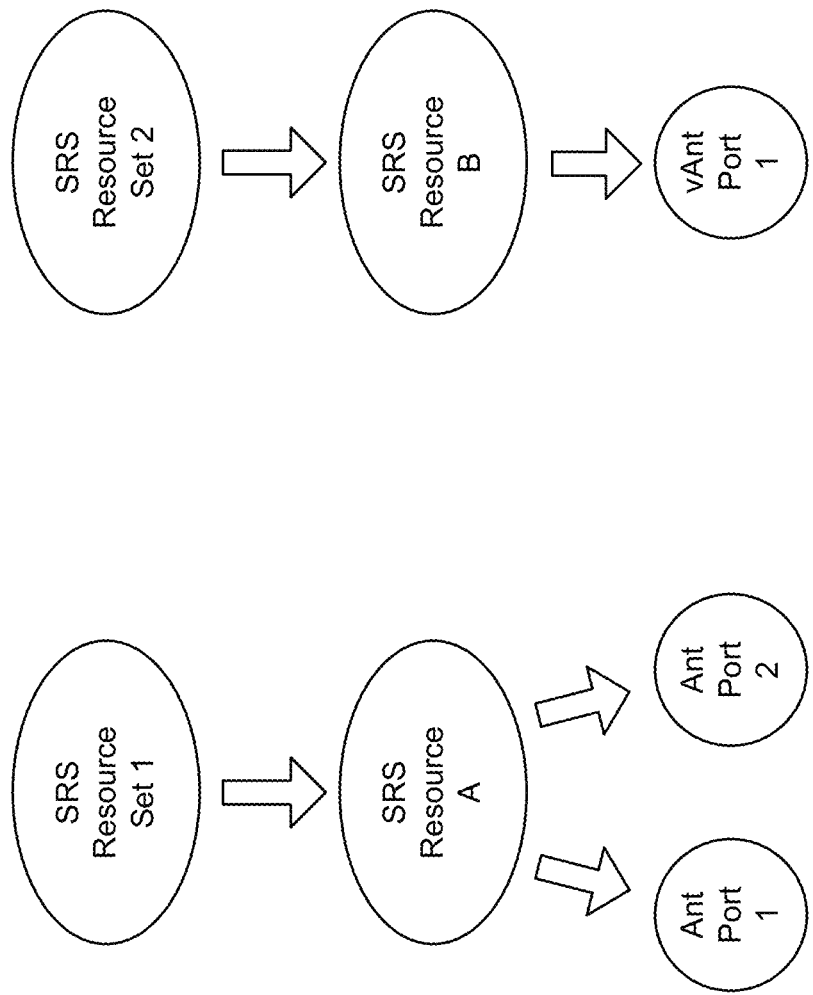

As illustrated in FIG. 4D, example SRS resource set configuration 3 may include a plurality of SRS resource sets. Each SRS resource set may configure one or more SRS resources. For example, SRS resource set 1 may configure SRS resource A, SRS resource set 2 may configure SRS resource B, and so on. SRS resource A may be mapped to a plurality of antenna ports (for example, antenna port 1 and antenna port 2) and SRS resource B may be mapped to a virtual antenna port (for example, virtual antenna port 1).

As illustrated in FIG. 4E, example SRS resource set configuration 4 may include a plurality of SRS resource sets. Each SRS resource set may configure one or more SRS resources. For example, and as illustrated in FIG. 4E, SRS resource set 1 may configure SRS resource A and SRS resource set 2 may configure SRS resource B and SRS resource C. SRS resource A may be mapped to a plurality of antenna ports (for example, antenna port 1 and antenna port 2), SRS resource B may be mapped to a virtual antenna port (for example, virtual antenna port 1), SRS resource C may be mapped to another virtual antenna port (for example, virtual antenna port 2), and so on.

As indicated above, other examples of SRS resource set configurations may be indicated by BS 110 and used by UE 120. For example, an SRS resource set configuration may include one or more SRS resource sets, and each respective SRS resource set may include one or more SRS resources that are respectively mapped to one or more antenna ports or a virtual antenna port.

In some aspects, each virtual antenna port, indicated in the SRS resource set configuration transmitted from BS 110, may have a particular relationship with two or more antenna ports indicated in the SRS resource set configuration transmitted from BS 110. In some aspects, the relationship between a virtual antenna port and two or more antenna ports may indicate that UE 120 is to generate the virtual antenna port from the two or more antenna ports. In this case, UE 120 may synthesize the two or more antenna ports to generate the virtual antenna port. In some aspects, the relationship between a virtual antenna port and two or more antenna ports may indicate that UE 120 is to generate the virtual antenna port, from the two or more antenna ports, by precoding the two or more antenna ports using a particular uplink precoder and applying a CDD cyclic shift to an antenna port of the two or more antenna ports. The particular uplink precoder may be indicated by a TPMI.

In some aspects, UE 120 may use the same uplink precoder for a plurality of virtual antenna ports (and thus, the plurality of virtual antenna ports may be associated with the same TPMI). In some aspects, UE 120 may use different uplink precoders for the different, respective virtual antenna ports (and thus, the virtual antenna ports may be associated with different, respective TPMIs). For example, UE 120 may precode the two or more antenna ports using an uplink precoder to determine a first virtual antenna port, may precode the two or more antenna ports (or another two or more antenna ports) using a different uplink precoder to determine a second virtual antenna port, and so on. In some aspects, UE 120 may use different uplink precoders for some virtual antenna ports, while using the same uplink precoder for other virtual antenna ports.

In some aspects, the relationship between a virtual antenna port and two or more antenna ports may be explicitly or implicitly indicated in the signaling communication that indicates the SRS resource set configuration or another signaling communication (for example, a signaling communication that instructs UE 120 to transmit an SRS on the virtual antenna port). In some aspects, UE 120 may be configured with information indicating the relationship between a virtual antenna port and two or more antenna ports and may be configured to select a particular uplink precoder based at least in part on the two or more antenna ports being non-coherent or partially coherent. In some aspects, the relationship between a virtual antenna port and two or more antenna ports may be indicated in a standard, a specification, a table, or the like.

Figure 4F:
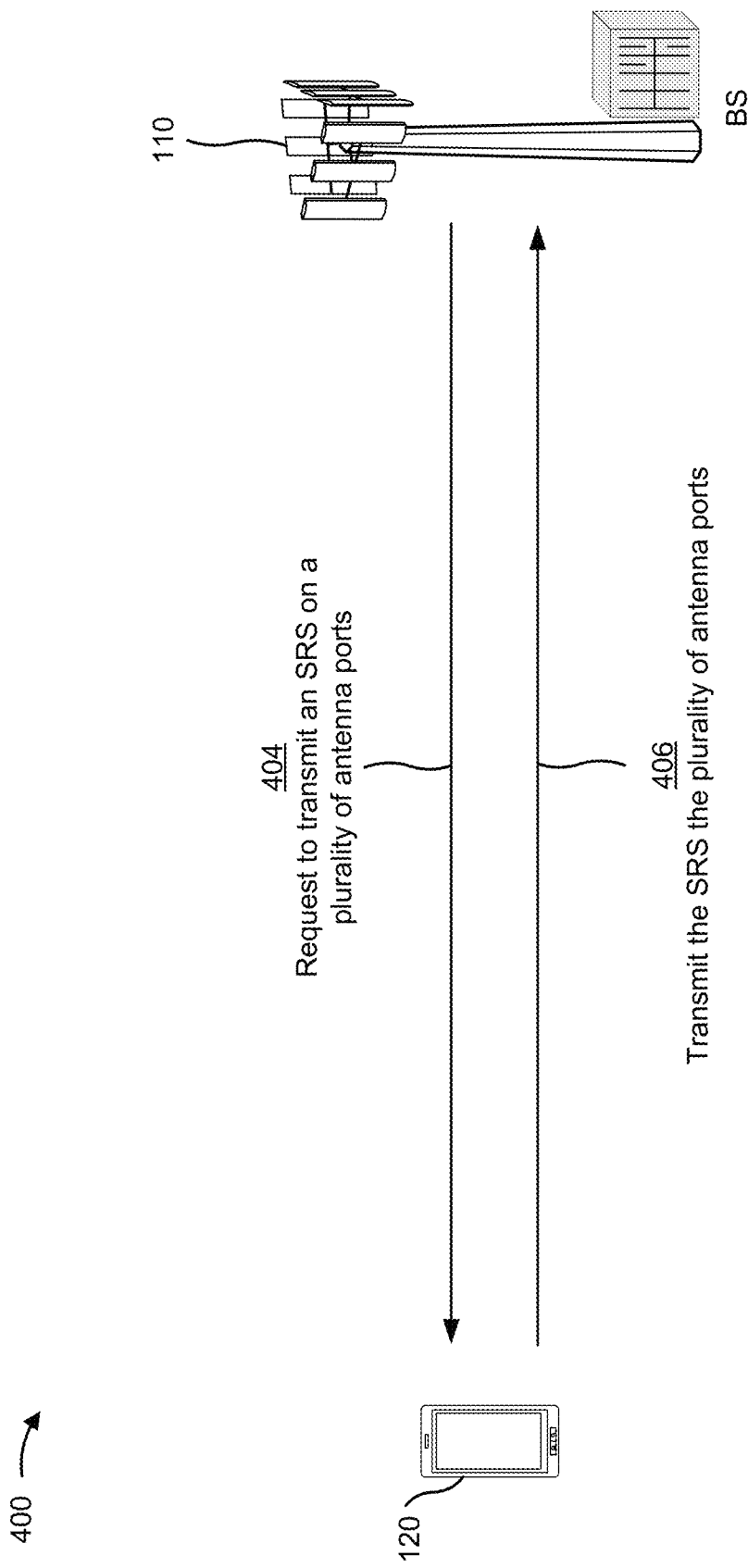

As shown in FIG. 4F, in a second operation 404, BS 110 may transmit, to UE 120, a request to transmit an SRS on the plurality of antenna ports. The request may be indicated in a signaling communication, such as an RRC communication, a MAC-CE communication, a DCI communication, or the like. As shown in FIG. 4F, in a third operation 406, UE 120 may transmit the SRS on a plurality of antenna ports. The plurality of antenna ports may be indicated in the SRS resource set configuration. UE 120 may transmit the SRS on the plurality of antenna ports based at least in part on receiving the request to transmit the SRS on the plurality of antenna ports.

In some aspects, BS 110 may perform one or more measurements of the SRS transmitted on the plurality of antenna ports to estimate respective channels mapped to the plurality of antenna ports. If BS 110 determines that the result of the one or more measurements satisfies a channel quality threshold, BS 110 may schedule the PUSCH transmission using the plurality of antenna ports. In this case, BS 110 may transmit a signaling communication to UE 120 that indicates an uplink precoder for transmitting the PUSCH transmission. UE 120 may then precode the PUSCH transmission based on the indicated uplink precoder and transmit the PUSCH transmission on one of the antenna ports.

Figure 4G:
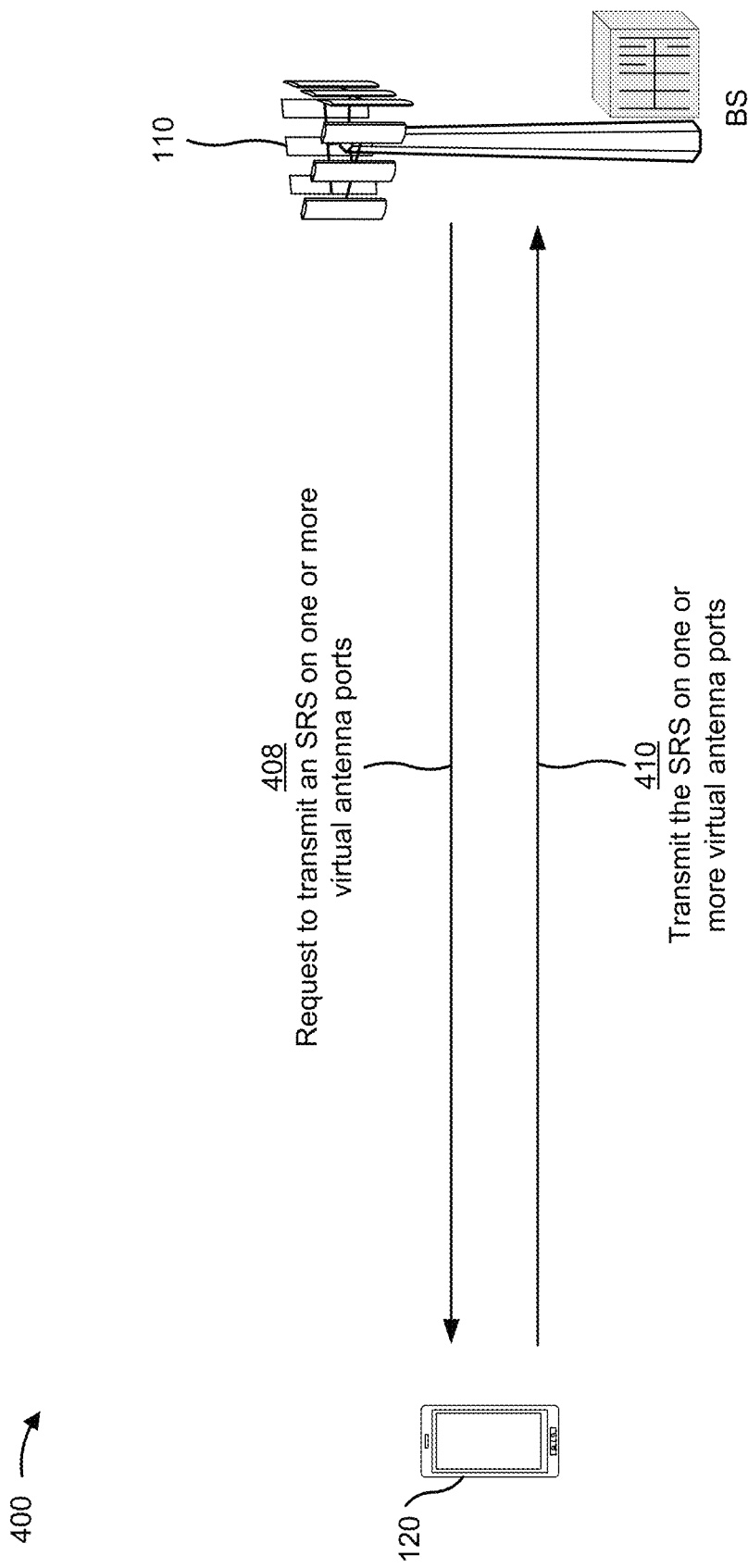

As shown in FIG. 4G, in a fourth operation 408, if BS 110 determines that the result of the one or more measurements does not satisfy the channel quality threshold, BS 110 may indicate, to UE 120, to transmit the SRS on the one or more virtual antenna ports. In this case, BS 110 may transmit a request (for example, in a signaling communication) for UE 120 to transmit the SRS on the one or more virtual antenna ports. The request may indicate the uplink precoder that UE 120 is to use to precode the plurality of antenna ports in order to synthesize and combine the plurality of antenna ports to generate a particular virtual antenna port.

As further shown in FIG. 4G, in a fifth operation 410, UE 120 may transmit the SRS on the one or more virtual antenna ports based at least in part on receiving the request to transmit the SRS on the one or more virtual antenna ports. Moreover, UE 120 may apply a CDD cyclic shift to an antenna port of the plurality of antenna ports in order to synthesize and combine the plurality of antenna ports to generate a particular virtual antenna port. BS 110 may identify the one or more virtual antenna ports based at least in part on UE 120 transmitting the SRS on the one or more virtual antenna ports. BS 110 may identify the one or more virtual antenna ports by performing one or more measurements of the SRS transmitted on the one or more virtual antenna ports to estimate respective channels mapped to the one or more virtual antenna ports.

Figure 4H:
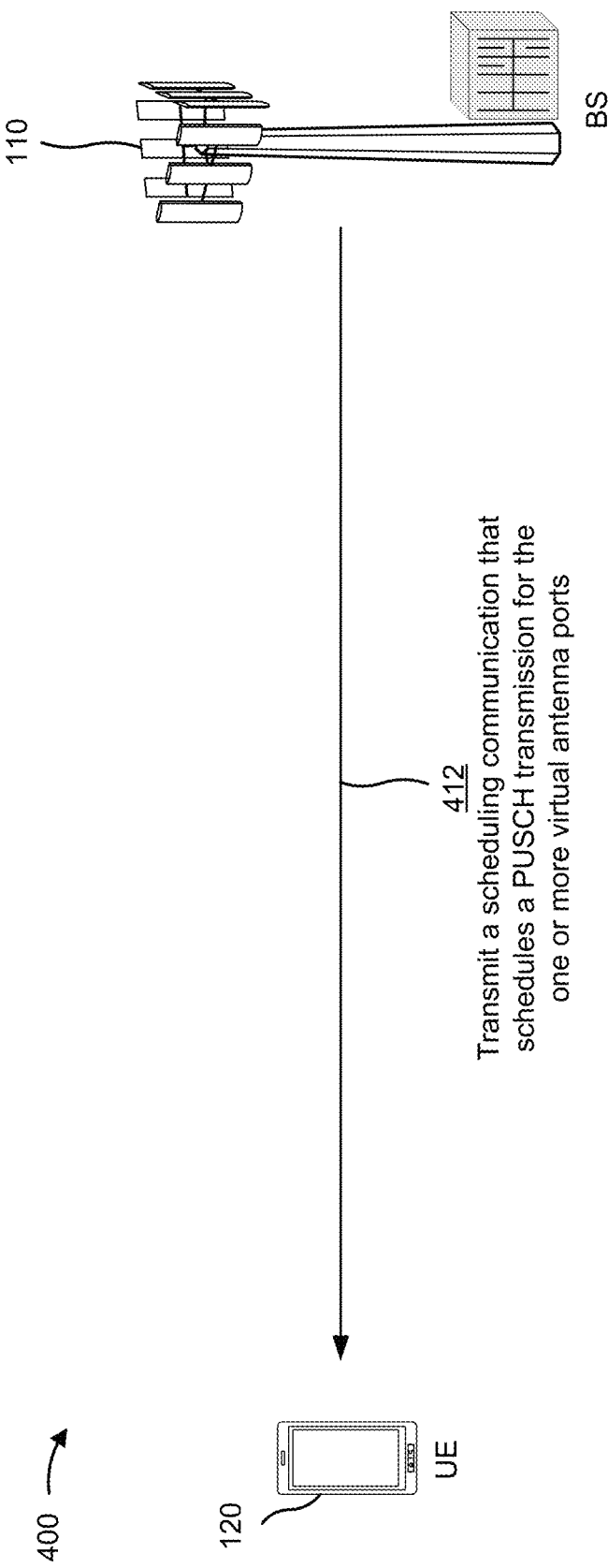

As shown in FIG. 4H, in a sixth operation 412, if BS 110 determines that the result of the one or more measurements obtained for the virtual antenna ports satisfies a channel quality threshold, BS 110 may schedule the PUSCH transmission using the one or more virtual antenna ports. In this case, BS 110 may transmit a signaling communication to UE 120 that indicates an uplink precoder for UE 120 to use to transmit the PUSCH transmission. UE 120 may precode the PUSCH transmission based on the indicated uplink precoder, and may transmit the PUSCH transmission on the one or more virtual antenna ports.

In some aspects, BS 110 may transmit the request to transmit the SRS on the plurality of antenna ports and the request to transmit the SRS on the one or more virtual antenna ports in the same signaling communication or in different signaling communications. If BS 110 transmits the request to transmit the SRS on the plurality of antenna ports and the request to transmit the SRS on the one or more virtual antenna ports in the same signaling communication, BS 110 may perform the one or more measurements for the SRS transmitted on the plurality of antenna ports and the measurements for the SRS transmitted on the one or more virtual antenna ports, and may transmit the signaling communication to schedule the PUSCH transmission using an antenna port or a virtual antenna port based at least in part on whether the results of any of the measurements indicate that the channel quality threshold is satisfied using the antenna port or the virtual antenna port.

In this way, UE 120 may explicitly indicate a virtual antenna port to BS 110 by transmitting an SRS using the virtual antenna port. BS 110 may indicate that UE 120 is to use the uplink precoder, for the PUSCH transmission, for the virtual antenna port. This permits the UE to use non-coherent or partially coherent antenna ports for the PUSCH transmission, which may increase transmit power of the PUSCH transmission, increase reliability of the PUSCH transmission (as a result of transmit or spatial diversity of the PUSCH transmission), or the like.

FIG. 5 is a diagram illustrating an example process 500 for SRS transmission to indicate a virtual antenna port performed, for example, by a UE, in accordance with various aspects of the present disclosure. Example process 500 is an example where a UE (e.g., UE 120) performs operations associated with SRS transmission to indicate a virtual antenna port.

As shown in FIG. 5, in some aspects, process 500 may include receiving an indication of an SRS resource set (block 510). For example, the UE (e.g., using receive processor 258, transmit processor 264, controller/processor 280, memory 282, and/or the like) may receive an indication of an SRS resource set, as described above.

As further shown in FIG. 5, in some aspects, process 500 may include transmitting an SRS on a first antenna port included in the SRS resource set (block 520). For example, the UE (e.g., using receive processor 258, transmit processor 264, controller/processor 280, memory 282, and/or the like) may transmit an SRS on a first antenna port included in the SRS resource set, as described above.

As further shown in FIG. 5, in some aspects, process 500 may include transmitting the SRS with a CDD cyclic shift on one or more second antenna ports included in the SRS resource set, a combination of the first antenna port and the one or more second antenna ports indicating one or more virtual antenna ports associated with the UE (block 530). For example, the UE (e.g., using receive processor 258, transmit processor 264, controller/processor 280, memory 282, and/or the like) may transmit the SRS with a CDD cyclic shift on one or more second antenna port included in the SRS resource set, as described above. In some aspects, a combination of the first antenna port and the one or more second antenna ports indicates one or more virtual antenna ports associated with the UE.

As further shown in FIG. 5, in some aspects, process 500 may include receiving, based at least in part on transmitting the SRS on the first antenna port and the second antenna port with the CDD cyclic shift, a signaling communication that schedules a PUSCH transmission for the one or more virtual antenna ports (block 540). For example, the UE (e.g., using receive processor 258, transmit processor 264, controller/processor 280, memory 282, and/or the like) may receive, based at least in part on transmitting the SRS on the first antenna port and the second antenna port with the CDD cyclic shift, a signaling communication that schedules a PUSCH transmission for the one or more virtual antenna ports, as described above.

Process 500 may include additional aspects, such as any single implementation or any combination of aspects described below and/or in connection with one or more other processes described elsewhere herein. In some aspects, the first antenna port and the one or more second antenna ports are non-coherent.

Figure 6:
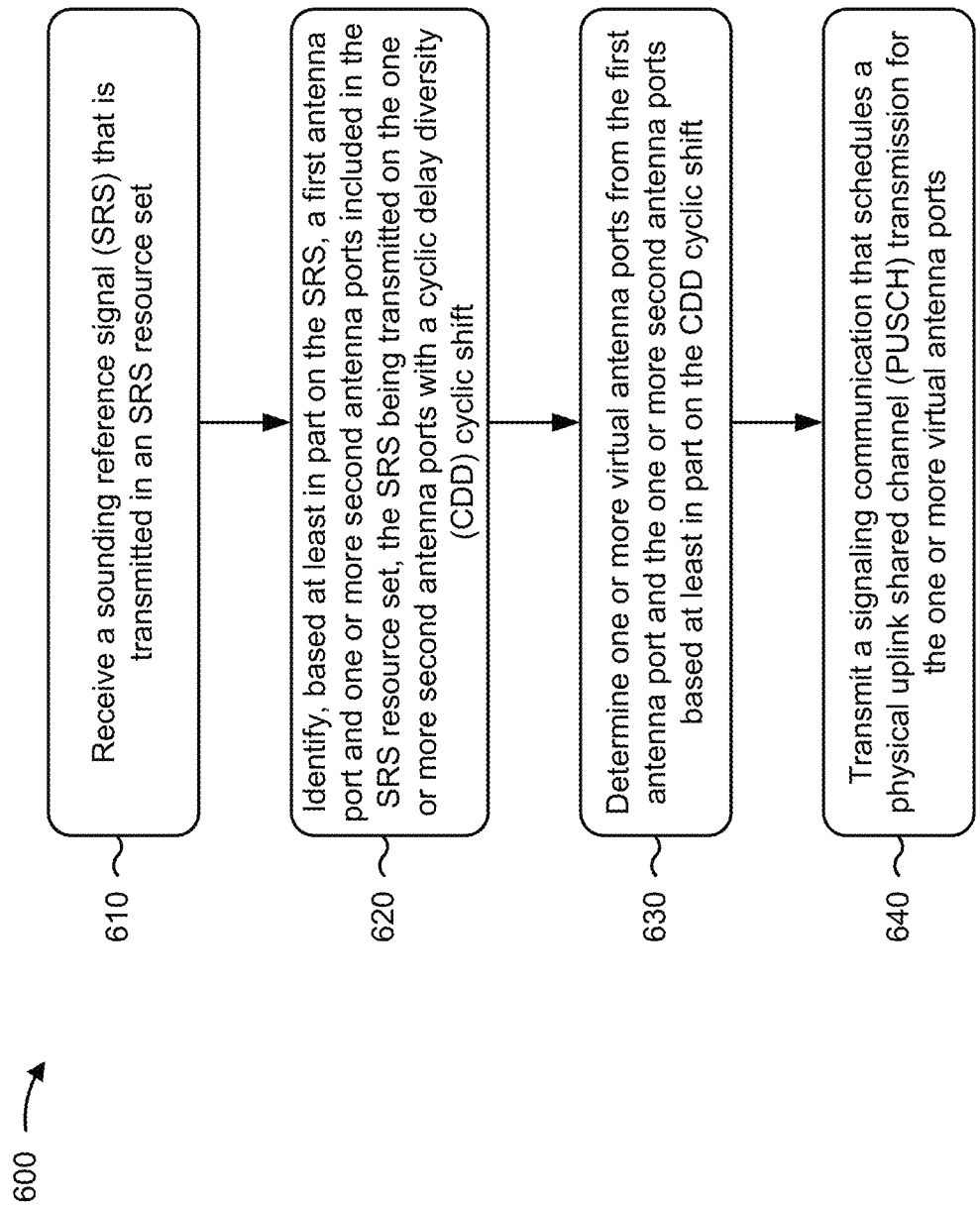
FIG. 6 is a diagram illustrating an example process for SRS transmission to indicate a virtual antenna port, performed by a BS, in accordance with various aspects of the present disclosure.

FIG. 6 is a diagram illustrating an example process 600 for SRS transmission to indicate a virtual antenna port performed, for example, by a BS, in accordance with various aspects of the present disclosure. Example process 600 is an example where a BS (e.g., BS 110) performs operations associated with SRS transmission to indicate a virtual antenna port.

As shown in FIG. 6, in some aspects, process 600 may include receiving an SRS that is transmitted in an SRS resource set (block 610). For example, the BS (e.g., using transmit processor 220, receive processor 238, controller/processor 240, memory 242, and/or the like) may receive an SRS that is transmitted in an SRS resource set, as described above.

As further shown in FIG. 6, in some aspects, process 600 may include identifying, based at least in part on the SRS, a first antenna port and one or more second antenna ports included in the SRS resource set, the SRS being transmitted on the one or more second antenna ports with a CDD cyclic shift (block 620). For example, the BS (e.g., using transmit processor 220, receive processor 238, controller/processor 240, memory 242, and/or the like) may identify, based at least in part on the SRS, a first antenna port and one or more second antenna ports included in the SRS resource set, as described above. In some aspects, the SRS is transmitted on the one or more second antenna ports with a CDD cyclic shift.

As further shown in FIG. 6, in some aspects, process 600 may include determining one or more virtual antenna ports from the first antenna port and the one or more second antenna ports (block 630). For example, the BS (e.g., using transmit processor 220, receive processor 238, controller/processor 240, memory 242, and/or the like) may determine one or more virtual antenna ports from the first antenna port and the one or more second antenna ports, as described above.

As further shown in FIG. 6, in some aspects, process 600 may include transmitting a signaling communication that schedules a PUSCH transmission for the one or more virtual antenna ports (block 640). For example, the BS (e.g., using transmit processor 220, receive processor 238, controller/processor 240, memory 242, and/or the like) may transmit a signaling communication that schedules a PUSCH transmission for the one or more virtual antenna ports, as described above.

Process 600 may include additional aspects, such as any single implementation or any combination of aspects described below and/or in connection with one or more other processes described elsewhere herein.

In a first aspect, the first antenna port and the one or more second antenna ports are non-coherent. In a second aspect, alone or in combination with the first aspect, determining the one or more virtual antenna ports includes combining the first antenna port and the one or more second antenna ports based at least in part on the SRS transmitted on the first antenna port and the SRS transmitted with the CDD cyclic shift on the one or more second antenna ports.

Figure 7:
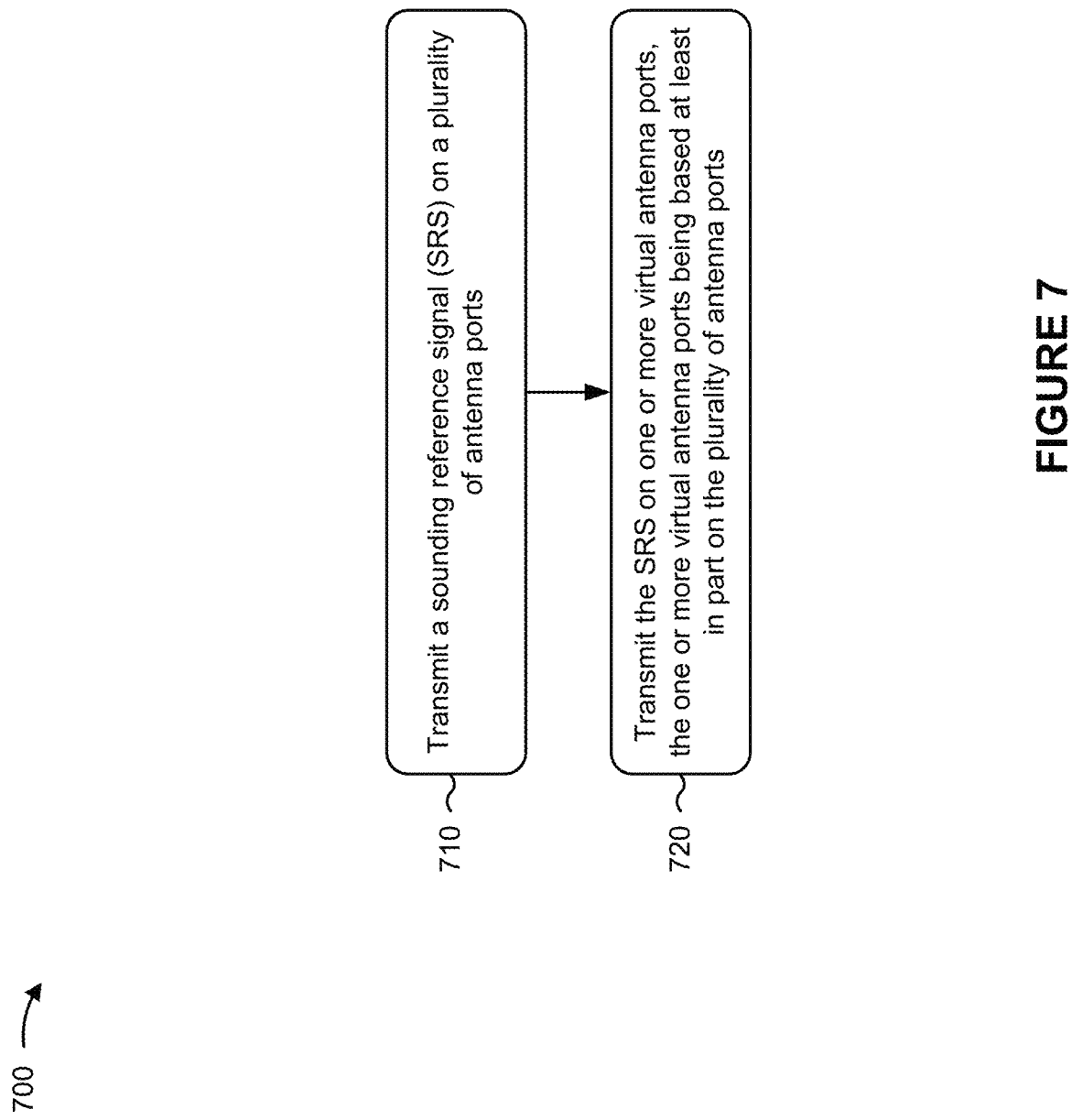
FIG. 7 is a diagram illustrating an example process for SRS transmission to indicate a virtual antenna port, performed by a UE, in accordance with various aspects of the present disclosure.

FIG. 7 is a diagram illustrating an example process 700 for SRS transmission to indicate a virtual antenna port performed, for example, by a UE, in accordance with various aspects of the present disclosure. Example process 700 is an example where a UE (e.g., UE 120) performs operations associated with SRS transmission to indicate a virtual antenna port.

As shown in FIG. 7, in some aspects, process 700 may include transmitting an SRS on a plurality of antenna ports (block 710). For example, the UE (e.g., using receive processor 258, transmit processor 264, controller/processor 280, memory 282, and/or the like) may transmit an SRS on a plurality of antenna ports, as described above.

As further shown in FIG. 7, in some aspects, process 700 may include transmitting the SRS on one or more virtual antenna ports, the one or more virtual antenna ports being based at least in part on the plurality of antenna ports (block 720). For example, the UE (e.g., using receive processor 258, transmit processor 264, controller/processor 280, memory 282, and/or the like) may transmit the SRS on one or more virtual antenna ports, the one or more virtual antenna ports being based at least in part on the plurality of antenna ports, as described above.

Process 700 may include additional aspects, such as any single implementation or any combination of aspects described below and/or in connection with one or more other processes described elsewhere herein.

In a first additional aspect, the plurality of antenna ports and the one or more virtual antenna ports are included in a same SRS resource set. In a second additional aspect, alone or in combination with the first additional aspect, the plurality of antenna ports is included in a first SRS resource, and each virtual antenna port, of the one or more virtual antenna ports, is included in a respective second SRS resource. In a third additional aspect, alone or in combination with one or more of the first or second additional aspects, the plurality of antenna ports is included in a first SRS resource, a first virtual antenna port of the one or more virtual antenna ports is included in a second SRS resource, and a second virtual antenna port of the one or more virtual antenna ports is included in a third SRS resource. In a fourth additional aspect, alone or in combination with one or more of the first through third aspects, process 700 further includes precoding the plurality of antenna ports and generating a virtual antenna port, of the one or more virtual antenna ports, is based at least in part on precoding the plurality of antenna ports.

In a fifth additional aspect, alone or in combination with one or more of the first through fourth aspects, an uplink precoder, used for precoding the plurality of antenna ports, is indicated in at least one of a table, a specification, or a standard. In a sixth additional aspect, alone or in combination with one or more of the first through fifth aspects, process 700 further includes receiving an indication of an uplink precoder in a signaling communication, and precoding the plurality of antenna ports includes precoding the plurality of antenna ports based at least in part on the uplink precoder. In a seventh additional aspect, alone or in combination with one or more of the first through sixth aspects, the signaling communication includes at least one of an RRC communication, a MAC-CE communication, or a DCI communication. In an eighth additional aspect, alone or in combination with one or more of the first through seventh aspects, process 700 further includes selecting an uplink precoder, used for precoding the plurality of antenna ports, based at least in part on the plurality of antenna ports being non-coherent.

In a ninth additional aspect, alone or in combination with one or more of the first through eighth aspects, process 700 further includes precoding the plurality of antenna ports based at least in part on a first uplink precoder; generating a first virtual antenna port, of the one or more virtual antenna ports, based at least in part on precoding the plurality of antenna ports based at least in part on the first uplink precoder; precoding the plurality of antenna ports based at least in part on a second uplink precoder; and generating a second virtual antenna port, of the one or more virtual antenna ports, based at least in part on precoding the plurality of antenna ports based at least in part on the second uplink precoder. In a tenth additional aspect, alone or in combination with one or more of the first through ninth aspects, the first uplink precoder and the second uplink precoder are a same uplink precoder. In an eleventh additional aspect, alone or in combination with one or more of the first through tenth aspects, the first uplink precoder and the second uplink precoder are different uplink precoders.

In a twelfth additional aspect, alone or in combination with one or more of the first through eleventh aspects, process 700 further includes applying a CDD cyclic shift to one or more antenna ports of the plurality of antenna ports and generating a virtual antenna port, of the one or more virtual antenna ports, based at least in part on the CDD cyclic shift applied to the one or more antenna ports. In a thirteenth additional aspect, alone or in combination with one or more of the first through twelfth aspects, the one or more virtual antenna ports are associated with respective TPMIs. In a fourteenth additional aspect, alone or in combination with one or more of the first through thirteenth aspects, process 700 further includes receiving a request from a B S to transmit the SRS on the plurality of antenna ports, and transmitting the SRS on the plurality of antenna ports includes transmitting the SRS on the plurality of antenna ports based at least in part on receiving the request.

In a fifteenth additional aspect, alone or in combination with one or more of the first through fourteenth aspects, process 700 further includes receiving a request from a BS to transmit the SRS on the one or more virtual antenna ports, and transmitting the SRS on the one or more virtual antenna ports includes transmitting the SRS on the one or more virtual antenna ports based at least in part on receiving the request. In a sixteenth additional aspect, alone or in combination with one or more of the first through fifteenth aspects, process 700 further includes receiving, based at least in part on transmitting the SRS on the one or more virtual antenna ports, a signaling communication that schedules a PUSCH transmission for the one or more virtual antenna ports.

In a seventeenth additional aspect, alone or in combination with one or more of the first through sixteenth aspects, process 700 further includes receiving a request from a BS to transmit the SRS on the plurality of antenna ports and the one or more virtual antenna ports, and transmitting the SRS on the plurality of antenna ports and the one or more virtual antenna ports includes transmitting the SRS on the plurality of antenna ports and the one or more virtual antenna ports based at least in part on receiving the request. In an eighteenth additional aspect, alone or in combination with one or more of the first through seventeenth aspects, process 700 further includes receiving, based at least in part on transmitting the SRS on the plurality of antenna ports and the one or more virtual antenna ports, a signaling communication that schedules a PUSCH transmission for the one or more virtual antenna ports. In a nineteenth additional aspect, alone or in combination with one or more of the first through eighteenth aspects, the plurality of antenna ports are included in a first SRS resource set and the one or more virtual antenna ports are included in a second SRS resource set different from the first SRS resource set.

Figure 8:
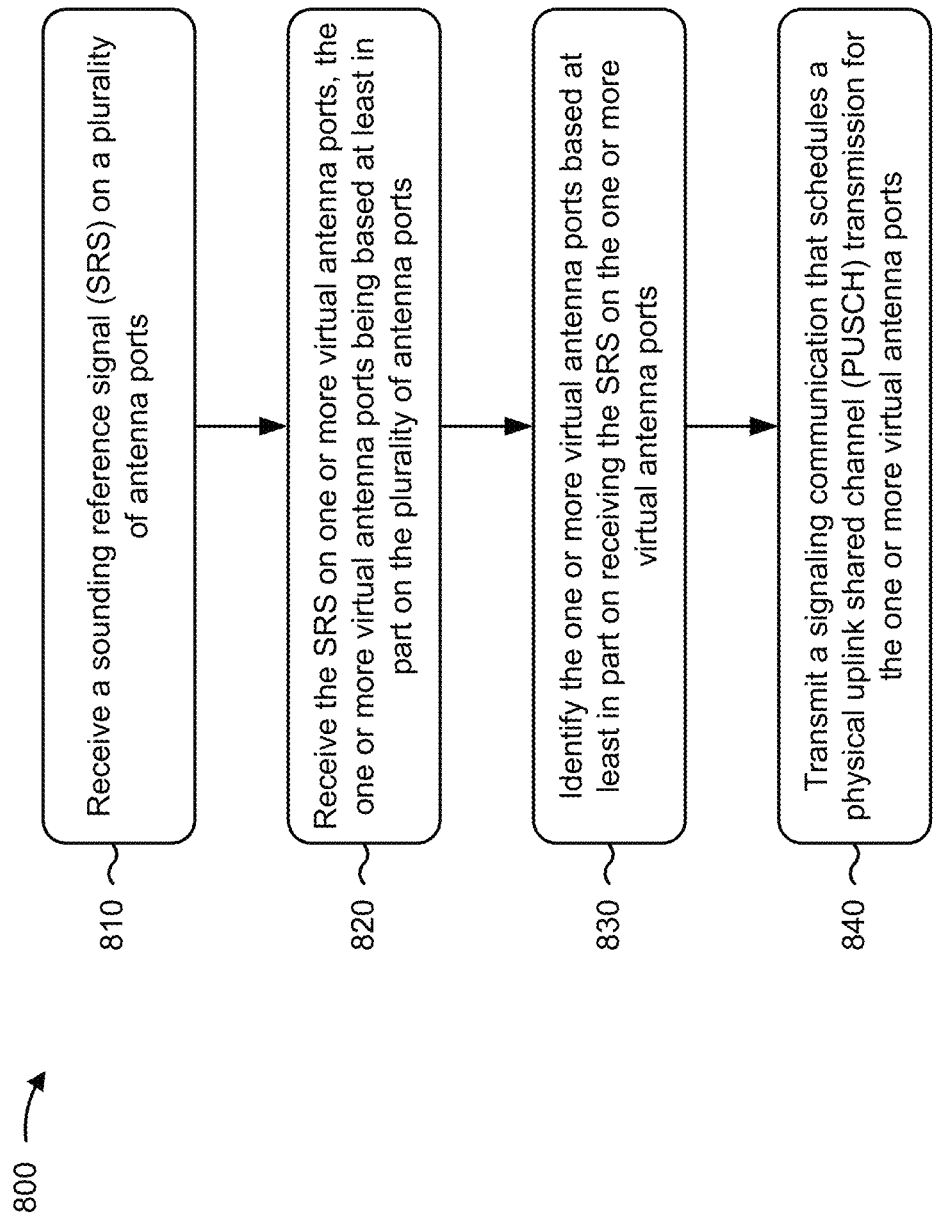
FIG. 8 is a diagram illustrating an example process for SRS transmission to indicate a virtual antenna port, performed by a BS, in accordance with various aspects of the present disclosure.

FIG. 8 is a diagram illustrating an example process 800 for SRS transmission to indicate a virtual antenna port performed, for example, by a BS, in accordance with various aspects of the present disclosure. Example process 800 is an example where a BS (e.g., BS 110) performs operations associated with SRS transmission to indicate a virtual antenna port.

As shown in FIG. 8, in some aspects, process 800 may include receiving an SRS on a plurality of antenna ports (block 810). For example, the BS (e.g., using transmit processor 220, receive processor 238, controller/processor 240, memory 242, and/or the like) may receive an SRS on a plurality of antenna ports, as described above.

As further shown in FIG. 8, in some aspects, process 800 may include receiving the SRS on one or more virtual antenna ports, the one or more virtual antenna ports being based at least in part on the plurality of antenna ports (block 820). For example, the BS (e.g., using transmit processor 220, receive processor 238, controller/processor 240, memory 242, and/or the like) may receive the SRS on one or more virtual antenna ports, the one or more virtual antenna ports being based at least in part on the plurality of antenna ports, as described above.

As further shown in FIG. 8, in some aspects, process 800 may include identifying the one or more virtual antenna ports based at least in part on receiving the SRS on the one or more virtual antenna ports (block 830). For example, the BS (e.g., using transmit processor 220, receive processor 238, controller/processor 240, memory 242, and/or the like) may identify the one or more virtual antenna ports based at least in part on receiving the SRS on the one or more virtual antenna ports, as described above.

As further shown in FIG. 8, in some aspects, process 800 may include transmitting a signaling communication that schedules a PUSCH transmission for the one or more virtual antenna ports (block 840). For example, the BS (e.g., using transmit processor 220, receive processor 238, controller/ processor 240, memory 242, and/or the like) may transmit a signaling communication that schedules a PUSCH transmission for the one or more virtual antenna ports, as described above.

Process 800 may include additional aspects, such as any single implementation or any combination of aspects described below and/or in connection with one or more other processes described elsewhere herein.

In a first additional aspect, the plurality of antenna ports and the one or more virtual antenna ports are included in a same SRS resource set. In a second additional aspect, alone or in combination with the first additional aspect, the plurality of antenna ports are included in a first SRS resource, and a virtual antenna port, of the one or more virtual antenna ports, is included in a second SRS resource. In a third additional aspect, alone or in combination with one or more of the first and second additional aspects, the plurality of antenna ports are included in a first SRS resource, a first virtual antenna port of the one or more virtual antenna ports is included in a second SRS resource, and a second virtual antenna port of the one or more virtual antenna ports is included in a third SRS resource. In a fourth additional aspect, alone or in combination with one or more of the first through third aspects, a virtual antenna port, of the one or more virtual antenna ports, is based at least in part on precoding the plurality of antenna ports. In a fifth additional aspect, alone or in combination with one or more of the first through fourth aspects, an uplink precoder, used for precoding the plurality of antenna ports, is indicated in at least one of a table, a specification, or a standard.

In a sixth additional aspect, alone or in combination with one or more of the first through fifth aspects, process 800 further includes transmitting another signaling communication indicating an uplink precoder that is to be used for precoding the plurality of antenna ports. In a seventh additional aspect, alone or in combination with one or more of the first through sixth aspects, the signaling communication and the other signaling communication include at least one of an RRC communication, a MAC-CE communication, or a DCI communication. In an eighth additional aspect, alone or in combination with one or more of the first through seventh aspects, an uplink precoder, used for precoding the plurality of antenna ports, is selected based at least in part on the plurality of antenna ports being non-coherent. In a ninth additional aspect, alone or in combination with one or more of the first through eighth aspects, a first virtual antenna port, of the one or more virtual antenna ports, is based at least in part on a first uplink precoder across the plurality of antenna ports, and a second virtual antenna port, of the one or more virtual antenna ports, is based at least in part on a second uplink precoder across the plurality of antenna ports.

In a tenth additional aspect, alone or in combination with one or more of the first through ninth aspects, the first uplink precoder and the second uplink precoder are a same precoder. In an eleventh additional aspect, alone or in combination with one or more of the first through tenth aspects, the first uplink precoder and the second uplink precoder are different uplink precoders. In a twelfth additional aspect, alone or in combination with one or more of the first through eleventh aspects, a virtual antenna port, of the one or more virtual antenna ports, is based at least in part on a CDD cyclic shift applied to one or more antenna ports of the plurality of antenna ports. In a thirteenth additional aspect, alone or in combination with one or more of the first through twelfth aspects, the one or more virtual antenna ports are associated with respective TPMIs. In a fourteenth additional aspect, alone or in combination with one or more of the first through thirteenth aspects, process 800 further includes transmitting a request to transmit the SRS on the plurality of antenna ports, and receiving the SRS on the plurality of antenna ports includes receiving the SRS on the plurality of antenna ports based at least in part on transmitting the request.

In a fifteenth additional aspect, alone or in combination with one or more of the first through fourteenth aspects, process 800 further includes transmitting a request to transmit the SRS on the one or more virtual antenna ports, and receiving the SRS on the one or more virtual antenna ports includes receiving the SRS on the one or more virtual antenna ports based at least in part on transmitting the request. In a sixteenth additional aspect, alone or in combination with one or more of the first through fifteenth aspects, process 800 further includes transmitting, based at least in part on receiving the SRS on the one or more virtual antenna ports, a signaling communication that schedules a PUSCH transmission for the one or more virtual antenna ports.

In a seventeenth additional aspect, alone or in combination with one or more of the first through sixteenth aspects, process 800 further includes transmitting a request to transmit the SRS on the plurality of antenna ports and the one or more virtual antenna ports, and receiving the SRS on the plurality of antenna ports and the one or more virtual antenna ports includes receiving the SRS on the plurality of antenna ports and the one or more virtual antenna ports based at least in part on transmitting the request. In an eighteenth additional aspect, alone or in combination with one or more of the first through seventeenth aspects, process 800 further includes transmitting, based at least in part on receiving the SRS on the plurality of antenna ports and the one or more virtual antenna ports, a signaling communication that schedules a PUSCH transmission for the one or more virtual antenna ports.

In a nineteenth additional aspect, alone or in combination with one or more of the first through eighteenth aspects, the plurality of antenna ports and the one or more virtual antenna ports are included in different SRS resource sets. In a twentieth additional aspect, alone or in combination with one or more of the first through nineteenth aspects, the first SRS resource is included in a first SRS resource set, the first SRS resource set being associated with a codebook use case, and the second SRS resource is included in a second SRS resource set, the second SRS resource set being associated with a non-codebook use case.

Figure 9:
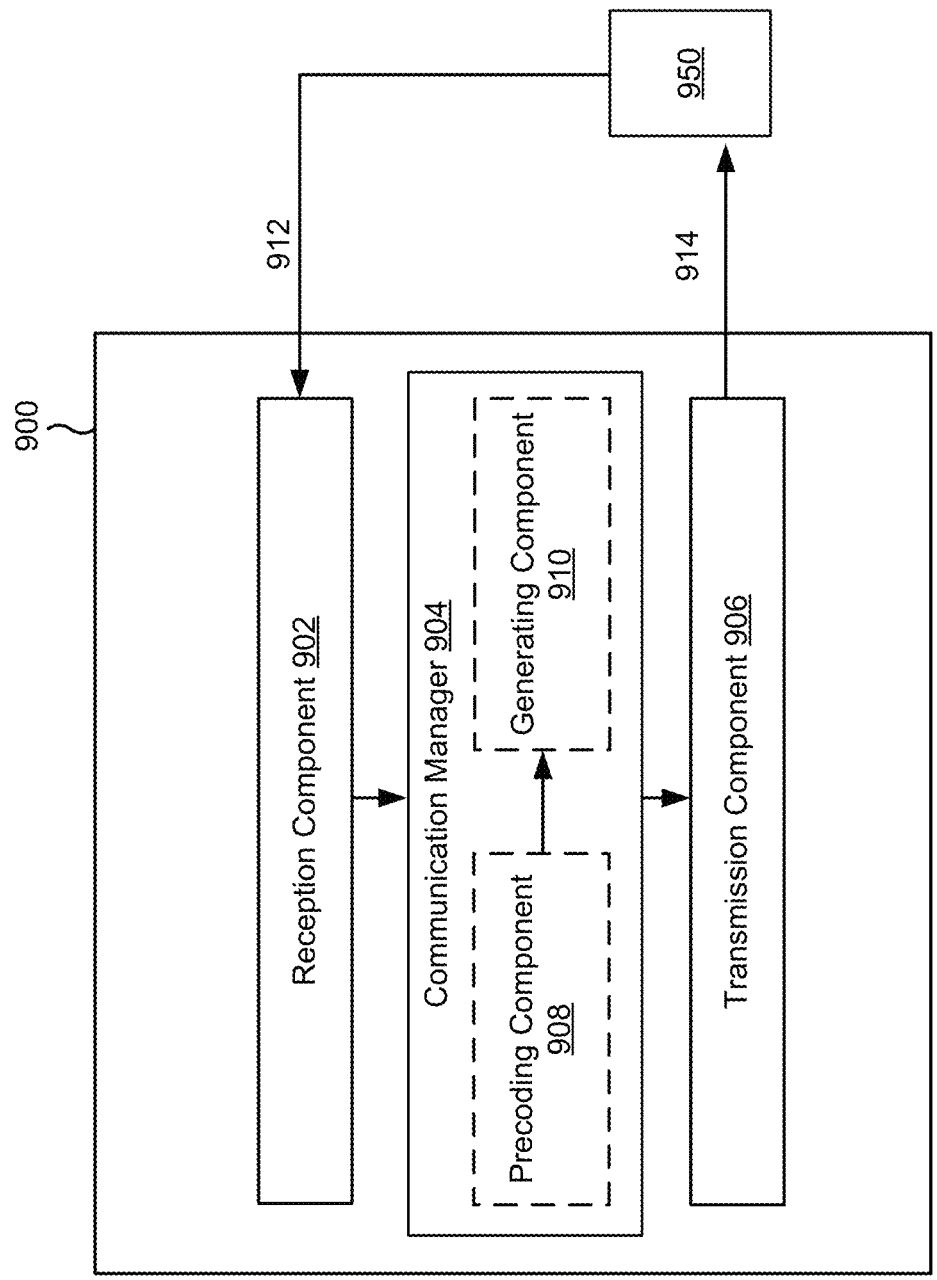
FIG. 9 is a block diagram of an example apparatus for wireless communication.

FIG. 9 is a block diagram of an example apparatus 900 for wireless communication. The apparatus 900 may be a UE (such as a UE 120), or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 950 (such as a UE, a base station, or another wireless communication device) using the reception component 902 and the transmission component 906.

In some aspects, the apparatus 900 may be configured to perform one or more operations described herein in connection with FIGS. 5-8. In some aspects, the apparatus 900 may include one or more components of the UE 120 described above in connection with FIG. 2.

The reception component 902 may receive communications, such as reference signals, control information, data communications, or a combination thereof, from the apparatus 910. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE 120 described above in connection with FIG. 2.

The transmission component 906 may transmit communications, such as reference signals, control information, data communications, or a combination thereof, to the apparatus 950. In some aspects, the communication manager 904 may generate communications and may transmit the generated communications to the transmission component 906 for transmission to the apparatus 910. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 950. In some aspects, the transmission component 1306 may include one or more antennas, a modulator, a transmit MIMO processor, a transmit processor, a controller/processor, a memory, or a combination thereof, of the UE 120 described above in connection with FIG. 2. In some aspects, the transmission component 906 may be collocated with the reception component 902 in a transceiver.

In some aspects, the communication manager 904 may receive, or may cause the reception component 902 to receive, from the apparatus 950 an indication of an uplink precoder in a signaling communication 912. In some aspects, the communication manager 904 may precode a plurality of antenna ports based at least in part on the indication of one or more uplink precoders received by reception component 902. In some aspects, the communication manager 904 may generate one or more virtual antenna ports based at least in part on precoding the plurality of antenna ports using a selected uplink precoder of the one or more indicated uplink precoders. In some aspects, the communication manager 904 may transmit, or may cause the transmission component 906 to transmit, an SRS 914 on the plurality of antenna ports and on the one or more virtual antenna ports to apparatus 950. In some aspects, the communication manager 904 may include a controller/processor, a memory, a scheduler, a communication unit, or a combination thereof, of the UE 120 described above in connection with FIG. 2.

In some aspects, the communication manager 904 may include one or more components, such as a precoding component 908 or a generating component 910, among other examples. Alternatively, the component(s) may be separate and distinct from the communication manager 904. In some aspects, the one or more components may include or may be implemented within a controller/processor, a memory, a scheduler, a communication unit, or a combination thereof, of the UE 120 described above in connection with FIG. 2. Additionally or alternatively, the one or more components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the precoding component 908 may precode the plurality of antenna ports on which the transmission component 906 is to transmit the SRS 914. In some aspects, the precoding component 908 may precode the plurality of antenna ports based at least in part on an indication of an uplink precoder received by reception component 902. In some aspects, the generating component 910 may generate the one or more virtual antenna ports on which the transmission component 906 is to transmit the SRS 914, based at least in part on the precoding of the plurality of antenna ports using the indicated uplink precoder.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
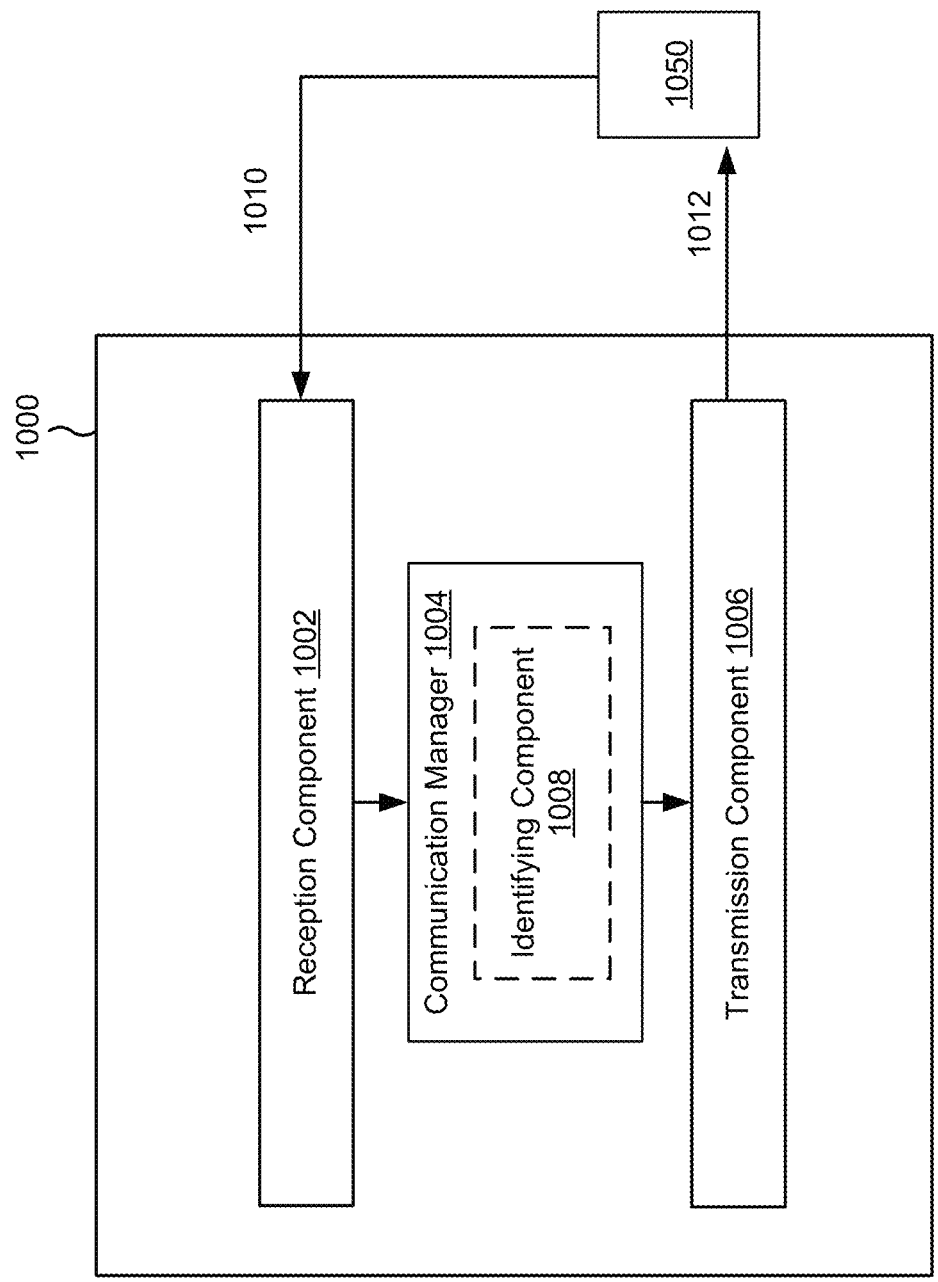
FIG. 10 is a block diagram of an example apparatus for wireless communication.

FIG. 10 is a block diagram of an example apparatus 1000 for wireless communication. The apparatus 1000 may be a BS (such as a BS 110), or a BS may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1050 (such as a UE, a base station, or another wireless communication device) using the reception component 1002 and the transmission component 1006.

In some aspects, the apparatus 1000 may be configured to perform one or more operations described herein in connection with FIGS. 5-8. In some aspects, the apparatus 1000 may include one or more components of the BS 110 described above in connection with FIG. 2.

The reception component 1002 may receive communications, such as reference signals, control information, data communications, or a combination thereof, from the apparatus 1050. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the BS 110 described above in connection with FIG. 2.

The transmission component 1006 may transmit communications, such as reference signals, control information, data communications, or a combination thereof, to the apparatus 1050. In some aspects, the communication manager 1004 may generate communications and may transmit the generated communications to the transmission component 1006 for transmission to the apparatus 1050. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1050. In some aspects, the transmission component 1006 may include one or more antennas, a modulator, a transmit MIMO processor, a transmit processor, a controller/processor, a memory, or a combination thereof, of the BS 110 described above in connection with FIG. 2. In some aspects, the transmission component 1006 may be collocated with the reception component 1002 in a transceiver.

In some aspects, the communication manager 1004 may receive, or may cause the reception component 1002 to receive, from the apparatus 1050, an SRS 1010 on a plurality of antenna ports and on one or more virtual antenna ports. In some aspects, the communication manager 1004 may identify the one or more virtual antenna ports based at least in part on the reception component 1002 receiving the SRS 1010 on the one or more virtual antenna ports. In some aspects, the communication manager 1004 may transmit, or may cause the transmission component 1006 to transmit, to the apparatus 1050, a signaling communication 1012 that schedules a PUSCH transmission for the one or more virtual antenna ports. In some aspects, the communication manager 1004 may include a controller/processor, a memory, a scheduler, a communication unit, or a combination thereof, of the BS 110 described above in connection with FIG. 2.

In some aspects, the communication manager 1004 may receive, or may cause the reception component 1002 to receive, from the apparatus 1050, an SRS 1010 that is transmitted in an SRS resource set. In some aspects, the communication manager 1004 may identify, based at least in part on the SRS 1010, a first antenna port and a second antenna port included in the SRS resource set, the SRS being transmitted on the one or more second antenna ports with a cyclic shift for CDD. In some aspects, the communication manager 1004 may determine one or more virtual antenna ports from the first antenna port and the one or more second antenna ports. In some aspects, the communication manager 1004 may transmit, or may cause the transmission component 1006 to transmit, a signaling communication that schedules a PUSCH transmission for the one or more virtual antenna ports.

In some aspects, the communication manager 1004 may include one or more components, such as an identifying component 1008 among other examples. Alternatively, the component(s) may be separate and distinct from the communication manager 1004. In some aspects, the one or more components may include or may be implemented within a controller/processor, a memory, a scheduler, a communication unit, or a combination thereof, of the BS 110 described above in connection with FIG. 2. Additionally or alternatively, the one or more components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the identifying component 1008 may identify the one or more virtual antenna ports based at least in part on the reception component 1002 receiving the SRS 1010 on the one or more virtual antenna ports. In some aspects, the identifying component 1008 may identify, based at least in part on the SRS 1010, a first antenna port and a second antenna port included in the SRS resource set, the SRS being transmitted on the one or more second antenna ports with a cyclic shift for CDD. In some aspects, the identifying component 1008 may determine one or more virtual antenna ports from the first antenna port and the one or more second antenna ports.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, a combination of hardware and software, or combinations thereof. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   transmitting a sounding reference signal (SRS) on a plurality of antenna ports mapped to a first SRS resource of an SRS resource set for the UE to use to transmit the SRS to a base station; and
   transmitting the SRS on one or more virtual antenna ports mapped to a second SRS resource of the SRS resource set,
      a quantity of the one or more virtual antenna ports mapped to the second SRS resource being different from a quantity of the plurality of antenna ports mapped to the first SRS resource.

2. The method of claim 1, wherein the plurality of antenna ports, the one or more virtual antenna ports, and a different virtual antenna port are included in the SRS resource set.

3. The method of claim 1, wherein the SRS resource set further includes a third SRS resource that is mapped to a different virtual antenna.

4. The method of claim 1, further comprising:
   precoding the plurality of antenna ports; and
   generating a virtual antenna port, of the one or more virtual antenna ports, based at least in part on precoding the plurality of antenna ports.

5. The method of claim 4, wherein an uplink precoder, used for precoding the plurality of antenna ports, is indicated in at least one of a table, a specification, or a standard.

6. The method of claim 4, further comprising receiving an indication of an uplink precoder in a signaling communication, wherein precoding the plurality of antenna ports comprises precoding the plurality of antenna ports based at least in part on the uplink precoder.

7. The method of claim 4, further comprising selecting an uplink precoder, used for precoding the plurality of antenna ports, based at least in part on the plurality of antenna ports being non-coherent.

8. The method of claim 1, further comprising:
   precoding the plurality of antenna ports based at least in part on a first uplink precoder;
   generating a first virtual antenna port, of the one or more virtual antenna ports, based at least in part on precoding the plurality of antenna ports based at least in part on the first uplink precoder;
   precoding the plurality of antenna ports based at least in part on a second uplink precoder; and
   generating a second virtual antenna port, of the one or more virtual antenna ports, based at least in part on precoding the plurality of antenna ports based at least in part on the second uplink precoder.

9. The method of claim 1, further comprising:
   applying a cyclic delay diversity (CDD) cyclic shift to one or more antenna ports of the plurality of antenna ports; and
   generating a virtual antenna port, of the one or more virtual antenna ports, based at least in part on the CDD cyclic shift applied to the one or more antenna ports.

10. The method of claim 1, wherein the one or more virtual antenna ports are associated with different, respective transmitted precoder matrix indicators (TPMIs).

11. The method of claim 1, further comprising receiving a request from a base station to transmit the SRS on the plurality of antenna ports and the one or more virtual antenna ports, wherein transmitting the SRS on the plurality of antenna ports and the one or more virtual antenna ports comprises transmitting the SRS on the plurality of antenna ports and the one or more virtual antenna ports based at least in part on receiving the request.

12. A method of wireless communication performed by a base station (BS), comprising:
   receiving a sounding reference signal (SRS) on a plurality of antenna ports mapped to a first SRS resource of an SRS resource set for a user equipment (UE) to use to transmit the SRS to the BS;
   receiving the SRS on one or more virtual antenna ports mapped to a second SRS resource of the SRS resource set,
      a quantity of the one or more virtual antenna ports mapped to the second SRS resource being different from a quantity of the plurality of antenna ports mapped to the first SRS resource;
   identifying the one or more virtual antenna ports based at least in part on the receiving the SRS on the one or more virtual antenna ports; and
   transmitting a signaling communication that schedules a physical uplink shared channel (PUSCH) transmission for the one or more virtual antenna ports.

13. The method of claim 12, wherein the plurality of antenna ports, the one or more virtual antenna ports, and a different virtual antenna port are included in the SRS resource set.

14. The method of claim 12, wherein the SRS resource set further includes a third SRS resource mapped to a different virtual antenna port.

15. The method of claim 12, wherein a virtual antenna port, of the one or more virtual antenna ports, is based at least in part on precoding the plurality of antenna ports.

16. The method of claim 15, wherein an uplink precoder, used for precoding the plurality of antenna ports, is indicated in at least one of a table, a specification, or a standard.

17. The method of claim 15, further comprising transmitting another signaling communication indicating an uplink precoder that is to be used for precoding the plurality of antenna ports.

18. The method of claim 17, wherein an uplink precoder, used for precoding the plurality of antenna ports, is selected based at least in part on the plurality of antenna ports being non-coherent.

19. The method of claim 12, wherein a virtual antenna port, of the one or more virtual antenna ports, is based at least in part on a first uplink precoder across the plurality of antenna ports, and wherein a different virtual antenna port, is based at least in part on a second uplink precoder across the plurality of antenna ports.

20. The method of claim 12, wherein a virtual antenna port, of the one or more virtual antenna ports, is based at least in part on a cyclic delay diversity (CDD) cyclic shift applied to one or more antenna ports of the plurality of antenna ports.

21. The method of claim 12, wherein the one or more virtual antenna ports are associated with respective transmitted precoder matrix indicators (TPMIs).

22. A user equipment (UE) for wireless communication, comprising:

a memory; and one or more processors operatively coupled to the memory, the memory and the one or more processors configured to:

transmit a sounding reference signal (SRS) on a plurality of antenna ports mapped to a first SRS resource of an SRS resource set for the UE to use to transmit the SRS to a base station; and transmit the SRS on one or more virtual antenna ports mapped to a second SRS resource of the SRS resource set, a quantity of the one or more virtual antenna ports mapped to the second SRS resource being different from a quantity of the plurality of antenna ports mapped to the first SRS resource.

23. The UE of claim 22, wherein the plurality of antenna ports, the one or more virtual antenna ports, and a different virtual antenna port are included in the SRS resource set.

24. The UE of claim 22, wherein the SRS resource set further includes a third SRS resource that is mapped to a different virtual antenna.

25. A base station (BS) for wireless communication, comprising:

a memory; and one or more processors operatively coupled to the memory, the memory and the one or more processors configured to:

receive a sounding reference signal (SRS) on a plurality of antenna ports mapped to a first SRS resource of an SRS resource set for a user equipment (UE) to use to transmit the SRS to the BS;

receive the SRS on one or more virtual antenna ports mapped to a second SRS resource of the SRS resource set, a quantity of the one or more virtual antenna ports mapped to the second SRS resource being different from a quantity of the plurality of antenna ports mapped to the first SRS resource;

identify the one or more virtual antenna ports based at least in part on the receiving the SRS on the one or more virtual antenna ports; and transmit a signaling communication that schedules a physical uplink shared channel (PUSCH) transmission for the one or more virtual antenna ports.

26. The BS of claim 25, wherein the SRS resource set further includes a third SRS resource mapped to a different virtual antenna port.

27. The method of claim 1, wherein the quantity of the one or more virtual antenna ports is a single virtual antenna port, and wherein the quantity of the plurality of antenna ports is two antenna ports.

28. The method of claim 1, wherein transmitting the SRS on the one or more virtual antenna ports comprises:

transmitting, to the base station, the SRS on the one or more virtual antenna ports after transmitting the SRS on the plurality of antenna ports to the base station.

29. The method of claim 1, further comprising:

combining the plurality of antenna ports to generate the one or more virtual antenna ports.

30. The method of claim 1, wherein transmitting the SRS on the plurality of antenna ports indicates the virtual antenna port to a base station.

* * * * *